US005708068A

United States Patent [19]

Carder et al.

[11] Patent Number: 5,708,068
[45] Date of Patent: Jan. 13, 1998

[54] AIRCRAFT DEICING/ANTI-ICING FLUIDS THICKENED BY ASSOCIATIVE POLYMERS

[75] Inventors: Charles Hobert Carder, Amma; Daniel Christopher Garska, St. Albans, both of W. Va.; Richard Duane Jenkins, Cary, N.C.; Mark Joseph McGuiness, So. Charleston, W. Va.

[73] Assignee: Union Carbide Chemicals & Plastics Technology Corporation, Danbury, Conn.

[21] Appl. No.: 586,970

[22] Filed: Jan. 16, 1995

[51] Int. Cl.$^6$ ...................................... C08K 5/06
[52] U.S. Cl. ..................... 524/375; 106/13; 252/70; 524/388; 524/389; 524/386
[58] Field of Search .................... 524/388, 389, 524/375, 386; 106/13; 252/70

[56] References Cited

U.S. PATENT DOCUMENTS

| | | | |
|---|---|---|---|
| 4,426,485 | 1/1984 | Hoy et al. | 524/591 |
| 4,814,096 | 3/1989 | Evani | 524/375 X |
| 5,118,435 | 6/1992 | Nieh | 524/388 X |
| 5,124,389 | 6/1992 | Mente | 524/378 |
| 5,157,069 | 10/1992 | Campbell | 524/500 |
| 5,268,116 | 12/1993 | Fusiak et al. | 524/388 X |
| 5,461,100 | 10/1995 | Jenkins et al. | 524/388 |

FOREIGN PATENT DOCUMENTS

| | | |
|---|---|---|
| 0003235 | 12/1978 | European Pat. Off. . |
| 0011806 | 11/1979 | European Pat. Off. . |
| 0216479 | 6/1986 | European Pat. Off. . |
| 2745872 | 10/1979 | Germany . |

OTHER PUBLICATIONS

Jenkins, R.D. et al., Associative Polymers with Novel Hydrophobe Structures, ACS Meeting, New York, New York, Aug. 26, 1991.

Nemoto, H. et al., J. Org. Chem., 1992, 57, 435.

*Primary Examiner*—Judy M. Reddick
*Attorney, Agent, or Firm*—J. B. Mauro

[57] ABSTRACT

A glycol- and/or glycerin-based "universal" aircraft fluid (i.e., usable as any of Type I, II, III, or IV fluids), and having good resistance to degradation of viscosity and other critical properties caused by exposure to heat and/or shear, is disclosed. The fluid may optionally be prepared as a concentrate, and thereafter significantly diluted in the field for diverse uses. The improved performance is achieved by neutralizing a latex of a hydrophobe-containing, polymeric thickener with a base, preferably an alkali metal hydroxide, and preferably in combination with a weak base, such as a salt of a weak acid, and a surfactant which associates with the thickener.

20 Claims, No Drawings

AIRCRAFT DEICING/ANTI-ICING FLUIDS THICKENED BY ASSOCIATIVE POLYMERS

RELATED APPLICATIONS

The following are related, commonly assigned patents and patent applications:

U.S. patent application Ser. No. 887,645; U.S. patent application Ser. No. 887,646; U.S. patent application Ser. No. 887,642; U.S. patent application Ser. No. 887,673; U.S. patent application Ser. No. 887,672; U.S. patent application Ser. No. 887,641; U.S. patent application Ser. No. 887,648; U.S. patent application Ser. No. 887,647; U.S. patent application Ser. No. 887,644; and U.S. patent application Ser. No. 887,671; all of which are incorporated herein by reference.

SUMMARY OF THE INVENTION

Technical Field

This invention relates to glycol- or glycerin-based aircraft deicing (ADFs)/anti-icing fluids (AAFs), hereinafter sometimes collectively called "aircraft fluids" (AFs), which are thickened with certain polymers containing hydrophobe-bearing macromonomers which thicken the AFs via an associative mechanism among hydrophobic moieties. More specifically, this invention relates to ADF/AAFs of the type described above that have improved thermal stability and therefore more utility as deicers (that are stored and applied at elevated temperatures). Since AFs according to the present invention have utility as both deicing and anti-icing fluids, they are hereinafter sometimes collectively referred to as "universal aircraft fluids" (UAFs).

BACKGROUND OF THE INVENTION

Aircraft that are either parked on the ground or are on the ground between flights can accumulate snow, ice, freezing rain or frost on the aircraft surfaces in cold winter weather. The presence of such deposits, particularly on airfoil surfaces, is a generally unsafe airfoil condition in that it hampers and can thwart liftoff, or at least is highly undesirable during takeoff and early flight periods since even small accumulations can result in severe deterioration of the airfoil aero-dynamic performance characteristics, occasionally causing crashes on takeoff/liftoff resulting in loss of life.

Glycols have long been used in aqueous solutions of various strengths that are sprayed onto the aircraft, as a deicing agent, to remove snow, ice, freezing rain and frost deposits from aircraft surfaces. These glycol-based aircraft deicing fluids are usually applied heated to more effectively break the ice bond or to melt the snow. A typical aircraft deicing fluid is composed of an alkaline glycol (typically ethylene glycol, propylene glycol and/or diethylene glycol) and water (solvent) mixtures (roughly equal parts on a weight basis; the pH is about 7.3 to 9.0) that contains ionic corrosion inhibitors, flame retardants and surfactants that promote wetting of the fluid on the aircraft during spray application. Instead of glycol, these ADFs can optionally be formulated with glycerin in the same manner. As used hereinafter, it is intended that any reference to glycol-based ADFs or AAFs or UAFs will also include such fluids formulated with glycerin instead of, or in addition to, one or more glycols.

Providing the hot fluid is applied close to the aircraft's surface, using a heated fluid will minimize the amount required to remove the snow and ice. The deicing fluids can also be applied in a high-pressure stream to flush the snow and ice deposits from the aircraft's surface.

After this treatment, the ADF desirably remains as a film coating on the aircraft surfaces, to serve as an anti-icing agent that provides continued antifreeze protection and delays the further formation or accretion of snow, ice, freezing rain or frost deposits on the aircraft surfaces. The same AF, in various concentrations, may ideally be used for both deicing and anti-icing functions. However, without a thickening agent, the deicing fluids tend to run off the inclined surfaces of the wing and tail and the nearly vertical surfaces of the fuselage and tail fin. Therefore, without a thickening agent, the deicing fluids provide only limited anti-icing protection.

AFs for more effective anti-icing protection, therefore, typically contain a thickening agent and desirably possess the following attributes (none of which precludes its use as a deicer):

(i) formation of an essentially continuous film coating, after its application by conventional spraying devices, even on non-horizontal aircraft surfaces critical to the aircraft's aero-dynamic performance during takeoff/liftoff such as the vertical tail fin, but not interfering with the smoothness of the fuselage surfaces;

(ii) extended protective anti-icing action; and (iii) viscosity and rheology characteristics that promote formation of an effective tenacious protective film coating, yet enable the fluid coating to flow off the aircraft airfoil surfaces as a result of wind-shear forces during takeoff, prior to aircraft rotation.

AAFs of the prior art are thickened typically with very large molecules (e.g., xanthan gum or various organic polymers, such as certain acrylics) which thicken by molecular entanglement and intermolecular friction. Such thickeners are deficient in that they do not provide optimal non-Newtonian behavior (i.e., their viscosity may not decrease sufficiently rapidly and/or extensively under wind-shear forces) for use under all weather conditions and on relatively slow-moving turboprop aircraft, such as commuter aircraft. Moreover, such thickeners are subject to undue degradation of viscosity as a result of severe shear forces imposed by the spraying nozzles used to apply an AF to the aircraft.

Important improvements in AAF technoology were provided by compositions disclosed and claimed in U.S. Pat. No. 5,461,100 and copending, co-assigned U.S. patent application Ser. No. 08/065,237, filed May 20, 1993, both of which are incorporated herein by reference. Those inventions were based on the unexpected discovery that certain macromonomer-containing polymeric thickeners which thicken by association among hydrophobes possess particular efficacy as thickeners for glycol-based aircraft anti-icing fluids. These fluids provided anti-icing fluids with protection times significantly longer than those obtainable with previous AAFs but, like previous AAFs, they found limited use as deicing fluids because the protection time afforded tended to be decreased by heating for long periods of time at the temperatures encountered in deicing operations.

The present invention is based on the unexpected discovery that such anti-icing fluid formulations can be modified so as to significantly improve their thermal stability, making them much more useful as deicing (as well as anti-icing) fluids.

DISCLOSURE OF THE INVENTION

In accordance with this invention, an anti-icing fluid, which retains its utility for anti-icing protection and is much more useful as a deicing fluid, is provided which is a glycoland/or glycerin-based solution thickened essentially with a hydrophobe-bearing, preferably macromonomer-containing polymer in an amount of less than about 5% by weight of the total composition. The polymer is present in the deicing/anti-icing fluid in an amount sufficient to thicken the fluid to promote its adherence to aircraft surfaces when applied to a stationary aircraft, but also allow for its wind-shear-induced removal during the takeoff run prior to rotation. The improved thermal stability is provided by use of the appropriate type and amount of neutralizing base, preferably by the addition of a stabilizing salt, and controlling the glycol and/or glycerin content and fluid pH.

Accordingly, the present invention provides an aircraft deicing/anti-icing fluid with enhanced thermal stability, comprising, in admixture, a glycol and/or glycerin, water, and a hydrophobe-bearing, preferably alkali-swellable, polymeric thickener which thickens principally by an intermolecular associative mechanism among hydrophobe groups, said fluid being sufficiently viscous to adhere to the airfoil surfaces of an aircraft at rest, but becoming sufficiently fluid under the influence of wind shear forces to flow off the airfoil surfaces when they are at or near take-off speed. Preferably, the thickener comprises a polymeric backbone to which the hydrophobes are attached by flexible, pendant chains, particularly wherein the flexible, pendant chains comprise one or more hydrophilic polymers. It is also desirable that the flexible, pendant chains are sufficiently long to place the hydrophobes beyond any carboxyl environment of the backbone, i.e., beyond any significant electronic influence of any carboxyl moieties attached to the backbone. While the thickeners of this invention are capable of considerable variation in molecular weight, depending upon their molecular constituency (and indeed that is one of their advantages), it is preferred that each repeating unit have a molecular weight of no more than about 6,000, preferably no more than about 3,000.

The properties of the present UAF may also be advantageously expressed in accordance with airline standard tests for performance: Water spray endurance time ("WSET"), boundary layer displacement thickness ("BLDT"), and viscosity. Accordingly, the present invention provides a UAF wherein the water spray endurance time is at least about 30 minutes, preferably at least about 80 minutes, but wherein the boundary layer displacement thickness is less than about 11 mm, preferably less than about 10 mm, and more preferably less than about 8 mm, at −20° C.

The invention further provides a method for thickening a glycol/water or glycerin/water deicing/anti-icing fluid comprising admixing with said fluid a thickener of this invention. In addition, the invention includes a method for providing anti-icing/deicing protection to aircraft comprising applying to the airfoil surfaces of the aircraft an ADF/AAF containing a thickener of this invention.

The thickeners of this invention are preferably derived from polymerizable carboxylic acids with which have been co-polymerized hydrophobe-bearing macromonomers. Thus, the preferred macromonomer-containing polymers useful in this invention comprise:

(A) about 1–99.9, preferably about 10–70, weight percent of one or more alpha, beta-mono- ethylenically unsaturated carboxylic acids, typically methacrylic acid;

(B) about 0–98.9, preferably about 30–85, weight percent of one or more monoethylenically unsaturated monomers, typically ethyl acrylate;

(C) about 0.1–99, preferably about 5–60, weight percent of one or more monoethylenically unsaturated macromonomers; and (D) about 0–20, preferably about 0–10, weight percent or greater of one or more polyethylenically unsaturated monomers, typically trimethylol propane triacrylate.

The macromonomer portion preferably comprises at least about 5% weight percent of the polymer.

The fluid is preferably a Society of Automotive Engineers (SAE)/International Standards Organization (ISO) Type II deicing/anti-icing fluid, thickened with a macromonomer-containing polymer in an amount of no more than about 5 weight %. The macromonomer-containing polymer thickener is desirably present in an amount of from about 0.05 to 4 weight %, preferably from about 0.1 to 2 weight %.

The glycol or glycerin component of the fluid is preferably ethylene glycol, either alone or in combination with other glycols like diethylene glycol or propylene glycol, and/or glycerin. The glycol or glycerin component of the fluid is desirably present in an amount of at least about 40 weight %, preferably from about 50–95 weight %, more preferably about 60–70 weight %. Because the freeze point curves are different for other glycols and glycerin, the preferred concentrations may be different than that for ethylene glycol, but within the skill of the art to determine.

The desired alkaline pH is obtained by admixture with a neutralizing base, which can be an amine, such as an alkylamine or alkanolamine, or preferably an alkali metal hydroxide or a combination thereof. The alkali metal hydroxides used alone, i.e., without an amine, are preferred, and sodium hydroxide is especially preferred. The amount of neutralizing base used should be enough to bring the solution pH to at least about 7.1, and preferably to a pH of about 8.5 to 9.5. Higher pHs actually further improve the thermal stability of the fluid, but higher pH fluids are not preferred because they are more corrosive to aluminum.

Desirably, the UAF may also contain a salt of an alkali metal hydroxide and a weak acid, which serves as an auxiliary base or stabilizing salt. Lower molecular weight salts are more effective. It is preferred, but not required, that the alkali metal portion of the salt molecule be the same as the neutralizing base; for example, sodium acetate works well with sodium hydroxide. Low levels of the salt are preferred because higher levels (even though they tend to further improve thermal stability) tend to diminish the protection times of the fluid when used in the anti-icing mode. Preferred stabilizing salt levels are 0 to about 0.10% by weight, with 0.0005 to about 0.02% being more preferred.

Accordingly, the present invention provides an anti-icing/deicing composition for treatment of aircraft which comprises an aqueous glycol and/or glycerine solution thickened with a polymeric thickener, and/or its salt after neutralization, in an amount sufficient to thicken the fluid to permit its adherence to aircraft surfaces when applied to a stationary aircraft but also permit its windshear-induced removal during takeoff, said polymer comprising, by weight of said polymer, (A) about 1–99.9% of one or more alpha, beta-monoethylenically unsaturated carboxylic acids;

(B) 0 to about 98.9% of one or more monoethylenically unsaturated monomers;

(C) about 0.1–99% of one or more monoethylenically unsaturated monomers, preferably macromonomers, containing at least one pendant hydrophobe moiety, preferably a complex hydrophobe moiety; and (D) 0 to about 20% of one or more polyethylenically unsaturated monomers, said composition comprising, by weight of the total composition, (1) at least about 40% of one or more glycols or glycerine or mixture thereof,
(2) at least about 0.05% of the thickener,
(3) a hydroxide, preferably a monovalent hydroxide, more preferably an alkali metal hydroxide, and preferably in the absence of amines, in an amount sufficient to provide a pH of at least about 7,
(4) a surfactant which associates with the thickener, in sufficient amount to increase the thickening effect of the thickener,
(5) optionally an effective amount of a corrosion inhibitor,
(6) optionally one or more dyes, and
(7) the remainder being water.

In a preferred embodiment, the above composition will also contain an effective amount, preferably at least about 0.0005%, of an auxiliary base, preferably a weak base, such as an acetate, phosphate, and the like.

The present invention further comprises an anti-icing/deicing composition as above, resulting from admixing the ingredients according to the recipe provided above.

The present still further comprises a method for producing an anti-icing/deicing composition as above, comprising admixing the ingredients according to the recipe provided above.

The composition of this invention can optionally be prepared as a concentrate suitable for dilution, as desired, to meet any given requirements for anti-icing or deicing performance, or both.

DETAILED DESCRIPTION OF THE INVENTION

As previously indicated, ADFs are used to remove ice, frost or accumulated snow or slush from aircraft surfaces, while AAFs prevent ice, snow, freezing rain and the like forms of frozen precipitations/accumulations from adhering to clean planes after deicing. A typical aircraft deicing fluid is composed of an alkaline ethylene, propylene or diethylene glycol or glycerin and water (solvent) mixture (roughly equal parts on a weight basis as a ready-to-apply fluid, or can be blended with more than about 80 percent by weight glycol or glycerin as a concentrate to be diluted in the field.) The pH is about 7.1 to 9.5, preferably about 8.5 to 9.5. The fluid may also contain ionic corrosion inhibitors, flame retardants, dyes, and surfactants that promote wetting of the fluid on the aircraft during spray application, and other optional materials within the skill of the art, provided only that they do not interfere with the functioning of the fluid for its intended purpose.

A typical aircraft anti-icing fluid contains the aforementioned components of the typical ADF, but also contains rheology modifiers. Common rheology modifiers used in aircraft anti-icing fluids include cross-linked polyacrylates, carboxypolymethylene, and polysaccharides (xanthan gum and Carrageenan). Airlines worldwide that operate in busy airports, with a need for longer protection times against ice, snow, freezing rain or frost, use these anti-icing fluids.

The ideal thickener thickens the AAF while the aircraft is at rest to prevent the accumulation of freezing rain, snow, slush or ice on the bare airfoil after de-icing, and to promote the adhesion of the fluid to vertical surfaces. To minimize lift loss, the AAF dramatically thins under shear so that it flows readily off the aircraft wing during the takeoff run prior to rotation—the point at which the airfoil life is sufficient for the pilot to take-off—which corresponds to a shear stress of on the order of about 10 Pascals (Pa). AAF viscosity should not vary greatly with temperature change or water dilution: a viscosity that doesn't change, or that increases slightly, with water dilution correlates with hold-over time—the length of time that the plane can last in bad weather without needing another de-icing treatment. One important way in which the AFs of this invention improve upon the prior art is by providing compositions which accept substantial dilution while still maintaining satisfactory performance properties. The present UAFs can be diluted slightly and used to anti-ice large, fixed-wing aircraft or commuter aircraft, and can be diluted more for use as a deicer (applied hot) for all types of aircraft. The present fluids differ from previous anti-icing fluids in that the formulation has been selected to improve the thermal stability while still maintaining the overall balance of properties desired, and in that the diluted versions still have low freeze points, making them useful in severe weather conditions.

The deicing/anti-icing fluid of this invention, along with its desirable performance characteristics, may be obtained with most conventional glycol- and/or glycerin-based fluids via use of the macromonomer-containing polymer as a fluid thickener. The macromonomer-containing polymer is intended for use as the primary thickener in conventional glycol- and/or glycerin-based deicing/anti-icing fluids for aircraft usage. Aircraft deicing/anti-icing fluids referred to as Society of Automotive Engineers (SAE)/International Standards Organization (ISO) Type II fluids contain a thickener, and the macromonomer-containing polymers described herein are especially well suited for use as thickeners in these fluids.

Glycol-based deicing and anti-icing fluids are well known, having been used for aircraft deicing and anti-icing applications for decades. The primary component of the fluid, which provides its deicing and anti-icing properties, is a water-soluble glycol compound. The glycol-based fluids typically contain one or more glycols selected from ethylene glycol, propylene glycol, and diethylene glycol, including mixtures thereof. Other glycols, glycerin, or polyols with freezing point depressant properties may also be used, along with the above-noted glycols, or in lieu of them.

A preferred fluid formulation contains ethylene glycol as the major glycol component, desirably at least about 80 weight % ethylene glycol. Propylene glycol and/or diethylene glycol may also be present in the glycol-based fluid. Diethylene glycol, in combination with propylene glycol, is another glycol formulation that is suitable for use in this invention. Glycerin may also be substituted for the glycol component, or be used in a mixture with the glycol or glycols. The choice and relative amounts of specific glycols present in the glycol-based fluid will depend on the particular deicing, anti-icing, antifreeze properties desired for the fluid, e.g., freezing point characteristics, pour point, etc.

The deicing/anti-icing fluid is an aqueous solution, i.e., ethylene glycol or other suitable glycol or glycerin that is diluted with water. The glycol or glycerin should be present in the aqueous solution in an amount of at least about 40 weight %, and preferably is present in an amount of at least about 50 weight %, up to about 95 weight %. The most preferred glycol or glycerin level range is about 60–75 weight %. The combined glycol (or glycerin) and water components of the fluid preferably constitute at least about 90 weight % of the total composition, and more preferably at least about 97 weight % of the total composition.

The amount of glycol or glycerin is desirably sufficient to yield a freezing point for the fluid that is less than about $-10°$ C., more preferably, less than about $-30°$ C. For a fluid to be used both neat and diluted, it is especially important that the glycol or glycerin level be kept high in the neat fluid so that dilutions (also) provide low freezing points.

The neutralizing agent can be an amine, an alkanolamine, an alkali metal hydroxide or some combination thereof. Use of the alkali metal hydroxides alone is preferred, and sodium hydroxide is especially preferred. While amines, e.g., triethanolamine, monoethanolamine, triethylamine, and the like, are permissible, the use of certain amines (e.g., triethanolamine) is not preferred, since such amines appear to reduce thermal stability. The amount of neutralizing base used should be enough to bring the solution pH to at least about 7.1, and preferably to a pH of about 8.5 to 9.5. While there is no critical upper limit on pH, it will be understood that the pH must be kept below the point at which corrosion of aircraft surfaces might occur. Without intending to be bound by any particular theory, it is believed that a high pH is desirable in order to minimize hydrolysis of the hydrophobic moieties of the associative thickeners of this invention. Such hydrolysis tends to lead to loss of hydrophobic association, hence to degraded low-shear viscosity.

An optional, but highly preferred, aspect of the present invention is the use of an auxiliary base, which can also be thought of as a stabilizing salt, or buffer. Such salt can be any salt of an alkali metal hydroxide and a weak acid, but lower molecular weight salts are more effective. Preferred weak bases are acetates, phosphates, and the like. It is preferred that the alkali metal portion of the salt molecule be the same as cation of the strong neutralizing base—for example, sodium acetate works well with sodium hydroxide; however, salts of other, or mixed, cations may often be effectively used as well. As a general guideline, it is recommended that the auxiliary base have a conjugate acid pKa of less than about 10, preferably less than about 5.

The method for preparing the compositions of this invention is not narrowly critical, and may comprise simply admixing the various ingredients under agitation for a sufficient period of time (typically at least about 15–20 minutes) for good mixing to occur, and for the associative thickening to accur. A preferred method of preparing compositions of this invention comprises (a) preparing a concentrate by adding, with agitation, to about 1 to about 20% by weight of the total desired amount of glycol (and/or glycerin)/water solvent, the surfactant and thickener; (b) adding, with agitation, the concentrate of (a) to the remainder of the solvent and agitating sufficiently to create a homogeneous slurry; (c) adding, with agitation, the neutralizing agent to the slurry of (b) and agitating sufficiently to create a homogeneous solution. This preferred method tends to produce more efficient mixing and thickening than does simple admixing.

Illustrative macromonomer-containing polymers useful in this invention and processes for preparation thereof are disclosed in copending U.S. patent application Ser. No. 887,647, which is incorporated herein by reference.

A large proportion of one or more alpha, beta-monoethylenically unsaturated carboxylic acid monomers can be present in the polymers useful in this invention. Various carboxylic acid monomers can be used, such as acrylic acid, methacrylic acid, ethacrylic acid, alpha-chloroacrylic acid, crotonic acid, fumaric acid, citraconic acid, mesaconic acid, itaconic acid, maleic acid and the like, including mixtures thereof. Methacrylic acid is preferred, particularly in concentrations of at least about 40% by weight of the polymer. A large proportion of carboxylic acid monomer is desirable to provide a polymeric structure which will swell or dissolve and provide a thickener when reacted with an alkali, e.g., sodium hydroxide.

The polymers useful in this invention can also contain a significant proportion of one or more monoethylenically unsaturated monomers. The preferred monomers provide water-insoluble polymers when homopolymerized and are illustrated by acrylate and methacrylate esters, such as ethyl acrylate, butyl acrylate or the corresponding methacrylate. Other monomers which can be used are styrene, alkyl styrenes, vinyl toluene, vinyl acetate, vinyl alcohol, acrylonitrile, vinylidene chloride, vinyl ketones and the like. Nonreactive monomers are preferred, those being monomers in which the single ethylenic group is the only group reactive under the conditions of polymerization. However, monomers which include groups reactive under baking conditions or with divalent metal ions such as zinc oxide may be used in some situations, like hydroxyethyl acrylate.

Other illustrative monoethylenically unsaturated monomers useful in this invention include, for example, propyl methacrylate, isopropyl methacrylate, butyl methacrylate, n-amyl methacrylate, sec.-amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, hydroxy ethyl methacrylate, hydroxy propyl methacrylate, vinyl propionate, vinyl butyrate, vinyl tert-butyrate, vinyl caprate, vinyl stearate, vinyl laurate, vinyl oleate, vinyl methyl ether, vinyl ethyl ether, vinyl n-propyl ether, vinyl iso-propyl ether, vinyl n-butyl ether, vinyl iso-butyl ether, vinyl iso-octyl ether, vinyl phenyl ether, a-chlorovinyl phenyl ether, vinyl b-naphthyl ether, methacryonitrile, acrylamide, methacrylamide, N-alkyl acrylamides, N-aryl acrylamides, N-vinyl pyrrolidone, N-vinyl-3-morpholinones, N-vinyl-oxazolidone, N-vinyl-imidazole and the like including mixtures thereof.

The macromonomers useful in this invention can be represented by the formula:

wherein:

$R^1$ is a monovalent residue of a substituted or unsubstituted hydrophobe compound;

each $R^2$ is the same or different and is a substituted or unsubstituted divalent hydrocarbon residue;

$R^3$ is a substituted or unsubstituted divalent hydrocarbon residue;

$R^4$, $R^5$ and $R^6$ are the same or different and are hydrogen or a substituted or unsubstituted monovalent hydrocarbon residue; and z is a value of 0 or greater.

The macromonomer compounds useful in this invention can be prepared by a number of conventional processes, except for inclusion of the complex hydrophobe compounds described herein. Illustrative processes are described, for example, in U.S. Pat. Nos. 4,514,552, 4,600,761, 4,569,965, 4,384,096, 4,268,641, 4,138,381, 3,894,980, 3,896,161, 3,652,497, 4,509,949, 4,226,754, 3,915,921, 3,940,351, 3,035,004, 4,429,097, 4,421,902, 4,167,502, 4,764,554, 4,616,074, 4,464,524, 3,657,175, 4,008,202, 3,190,925, 3,794,608, 4,338,239, 4,939,283 and 3,499,876. The macromonomers can also be prepared by methods disclosed in copending U.S. patent application Ser. No. 887,645, which is incorporated herein by reference. Other macromonomer compounds which may be useful in this invention include complex hydrophobe-bearing oligomers disclosed in copending U.S. patent application Ser. No. 887,646, which is incorporated herein by reference.

The hydrophobe residue represented by $R^1$ in formula I, above, may be a simple hydrophobe or a complex hydrophobe, or a mixture thereof. Complex hydrophobes, however, are preferred. Different hydrophobes may be present on the same molecule, or may be provided by physical blends of different polymers. By simple hydrophobes is meant commercial hydrophobes currently available, typically composed of less than about 30 carbon atoms, as illustrated in Table I of U.S. Pat. No. 4,426,485. By complex hydrophobe is meant hydrophobes described below and in Tables 2 and 3 of U.S. Pat. No. 5,292,828.

Illustrative substituted and unsubstituted divalent hydrocarbon residues represented by $R^2$ in formula I, above, include those described for the same type of substituents in formulae (i) and (ii) below. Illustrative substituted and unsubstituted monovalent hydrocarbon residues represented by $R^4$, $R^5$ and $R^6$ in formula I, above, include those described for the same types of substituents in formulae (i) and (ii) below.

Illustrative $R^3$ substituents include, for example, the organic residue of ethers, esters, urethanes, amides, ureas, urethanes, anhydrides, and the like, including mixtures thereof. The $R^3$ substituent can be generally described as a "linkage" between the complex hydrophobe-bearing surfactant or alcohol, and the unsaturation portion of the macromonomer compound. Preferred linkages include the following: urethane linkages from the reaction of an isocyanate with a hydroxyl-bearing surfactant; urea linkages from the reaction of an isocyanate with an amine-bearing surfactant; unsaturated esters of surfactants such as the esterification product of a surfactant with an unsaturated carboxylic acid or an unsaturated anhydride; unsaturated esters of alcohols; esters of ethyl acrylate oligomers, acrylic acid oligomers, and allyl-containing oligomers; half-esters of surfactants such as those made by the reaction of a surfactant with maleic anhydride; unsaturated ethers prepared by reacting vinyl benzyl chloride and a surfactant or by reacting an allyl glycidyl ether with a surfactant, alcohol, or carboxylic acid.

The oxyalkylene moieties included in the macromonomer compounds (I) may be homopolymers or block or random copolymers of straight or branched alkylene oxides. Mixtures of alkylene oxides such as ethylene oxide and propylene oxide may be employed. It is understood that each $R^2$ group in a particular substituent for all positive values of z can be the same or different. While ethylene oxide is preferred, it has been observed that large amounts of ethylene oxide may have a detrimental effect on the thermal and/or dilution stability of the thickened AF.

The complex hydrophobe compounds having at least one active hydrogen useful in preparing the macromonomer compounds useful in this invention can be represented by the formula:

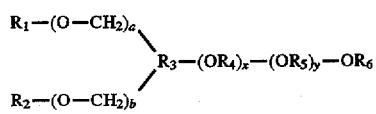

(i)

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$, or having more than 2 pendant carbon atoms in the case of $R_3$, $R_4$ and $R_5$.

Other complex hydrophobe compounds having at least one active hydrogen useful in preparing the macromonomer compounds useful in this invention can be represented by the formula:

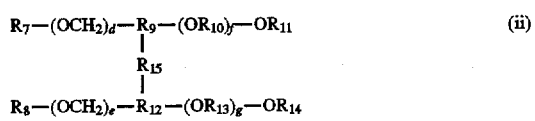

(ii)

wherein $R_7$ and $R_8$ are the same or different and are hydrogen or a substituted or unsubstituted monovalent hydrocarbon residue, $R_{11}$ and $R_{14}$ are the same or different and are hydrogen, a substituted or unsubstituted monovalent hydrocarbon residue or an ionic substituent, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ and $R_{14}$, or having more than 2 pendant carbon atoms in the case of $R_9$, $R_{10}$, $R_{12}$, $R_{13}$ and $R_{15}$.

Illustrative substituted and unsubstituted monovalent hydrocarbon residues contain from 1 to about 50 carbon atoms or greater and are selected from alkyl radicals including linear or branched primary, secondary or tertiary alkyl radicals, such as methyl, ethyl, n-propyl, isopropyl, amyl, sec-amyl, t-amyl, 2-ethylhexyl and the like; aryl radicals such as phenyl, naphthyl and the like; arylalkyl radicals such as benzyl, phenylethyl, triphenylmethylethane and the like; alkylaryl radicals such as octylphenyl, nonylphenyl, dodecylphenyl, tolyl, xylyl and the like; and cycloalkyl radicals such as cyclopentyl, cyclohexyl, cyclohexylethyl and the like. The permissible hydrocarbon residues may contain fluorine, silicon, or other non-carbon atoms.

Preferably, the substituted and unsubstituted hydrocarbon residues are selected from alkyl and aryl radicals which contain from about 1 to 30 carbon atoms or greater. More preferably, the alkyl radicals contain from 1 to 18 carbon atoms, while the aryl, arylalkyl, alkylaryl and cycloalkyl radicals preferably contain from 6 to 18 carbon atoms or greater.

In a preferred embodiment of this invention, $R_1$, $R_2$, $R_7$ and $R_8$ can individually be a hydrocarbon radical represented by the formula:

(iii)

wherein $R_{16}$ and $R_{17}$ are as defined for $R_1$, $R_2$, $R_7$ and $R_8$ above, h and i are the same or different and are a value of 0 or 1, and $R_{18}$ is as defined for $R_3$ above. For compounds represented by formulae (i) and (ii), it is understood that each formula (iii) radical in a given compound may be the same or different and the $R_{16}$ and/or $R_{17}$ groups may themselves be a formula (iii) radical to provide complex hydrophobes of a dendritic or of a cascading nature as described below. Further, $R_4$, $R_5$, $R_{10}$ and $R_{13}$ can individually be a hydrocarbon radical represented by the formula:

 (iv)

wherein $R_{19}$ is as defined for $R_4$, $R_5$, $R_{10}$ and $R_{13}$ above, $R_{20}$ is as defined for $R_6$, $R_{11}$ and $R_{14}$ above, and j is a value of 0 or greater.

Illustrative ionic substituents for $R_6$, $R_{11}$, $R_{14}$ and $R_{20}$ include cationic and anionic substituents such as sulfates, sulfonates, phosphates and the like. $R_6$, $R_{11}$, $R_{14}$ and $R_{20}$ may preferably be an organic residue containing 1 or more hydroxyls or nitrogen derivatives or epoxides or other reactive groups which may or may not contain unsaturation.

Other illustrative terminal groups which are described by $R_6$, $R_{11}$, $R_{14}$ and $R_{20}$ include, for example, hydrocarbon residues which may contain allylic or vinylic unsaturation, acrylic or methacrylic functionality, styryl or alpha-methylstyryl functionality, and the like, such as the reaction product between the terminal alcohol ($R_6$, $R_{11}$, $R_{14}$ and $R_{20}$=H) and glycidyl methacrylate, isocyanatoethyl methacrylate, alpha, alpha-dimethyl-m-isopropenyl benzyl isocyanate (m-TMI), and the like. Other examples of terminal groups may include hydrocarbon residues of alkyl, aryl, aralkyl, alkaryl, and cycloalkyl radicals which may or may not be substituted with one or more of the following: hydroxyl, carboxyl, isocyanato, amino, mono- or disubstituted amino, quaternary ammonium, sulfate, sulfonate, phosphate, epoxy, and the like and may or may not contain other non-carbon atoms including silicon or fluorine. Also included can be divalent siloxy radicals. Other nonhydrocarbon terminal groups may include sulfates, phosphates, and the like.

Illustrative divalent hydrocarbon residues represented by $R_3$, $R_4$, $R_5$, $R_9$, $R_{10}$, $R_{12}$, $R_{13}$, $R_{15}$, $R_{18}$ and $R_{19}$ in the above formulae include substituted and unsubstituted radicals selected from alkylene, -alkylene-oxy-alkylene-, -arylene-oxy-arylene-, arylene, alicyclic radicals, phenylene, naphthylene, -phenylene-$(CH_2)_m(Q)_n(CH_2)_m$-phenylene- and -naphthylene-$(CH_2)_m(Q)_n(CH_2)_m$-naphthylene- radicals, wherein Q individually represents a substituted or unsubstituted divalent bridging group selected from —$CR_{21}R_{22}$—, —O—, —S—, —$NR_{23}$—, —$SiR_{24}R_{25}$— and —CO—, wherein $R_{21}$ and $R_{22}$ individually represent a radical selected from hydrogen, alkyl of 1 to 12 carbon atoms, phenyl, tolyl and anisyl; $R_{23}$, $R_{24}$ and $R_{25}$ individually represent a radical selected from hydrogen and methyl, and each m and n individually have a value of 0 or 1. More specific illustrative divalent radicals represented by $R_3$, $R_4$, $R_5$, $R_9$, $R_{10}$, $R_{12}$, $R_{13}$, $R_{15}$, $R_{18}$ and $R_{19}$ include, e.g., 1,1-methylene, 1,2-ethylene, 1,3-propylene, 1,6-hexylene, 1,8-octylene, 1,12-dodecylene, 1,4-phenylene, 1,8-napthylene, 1,1'-biphenyl-2,2'-diyl, 1,1'-binaphthyl-2,2'-diyl, 2,2'-binaphthyl-1,1'-diyl and the like. The alkylene radicals may contain from 2 to 12 carbon atoms or greater, while the arylene radicals may contain from 6 to 18 carbon atoms or greater. Preferably, $R_3$, $R_4$, $R_5$, $R_9$, $R_{10}$, $R_{12}$, $R_{13}$, $R_{15}$, $R_{18}$ and $R_{19}$ are an alkylene or arylene radical. The permissible divalent hydrocarbon residues may contain fluorine, silicon, or other non-carbon atoms.

Illustrative trivalent hydrocarbon residues represented by $R_3$, $R_9$, $R_{12}$ and $R_{18}$ in the above formulae include substituted and unsubstituted radicals selected from

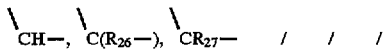

and the like, wherein $R_{26}$ is a substituted or unsubstituted monovalent hydrocarbon residue as described herein and $R_{27}$ is a substituted or unsubstituted divalent hydrocarbon residue as described herein.

Of course, it is to be further understood that the hydrocarbon residues in the above formulae may also be substituted with any permissible substituent. Illustrative substituents include radicals containing from 1 to 18 carbon atoms such as alkyl, aryl, aralkyl, alkaryl and cycloalkyl radicals; alkoxy radicals; silyl radicals such as —$Si(R_{28})_3$ and —Si$(OR_{28})_3$, amino radicals such as —$N(R_{28})_2$; acyl radicals such as —$C(O)R_{28}$; acyloxy radicals such as —$OC(O)R_{28}$; carbonyloxy radicals such as —$COOR_{28}$; amido radicals such as —$C(O)N(R_{28})_2$ and —$N(R_{28})COR_{28}$; sulfonyl radicals such as —$SO_2R_{28}$; sulfinyl radicals such as —$SO(R_{28})_2$; thionyl radicals such as —$SR_{28}$; phosphonyl radicals such as —$P(O)(R_{28})_2$; as well as halogen, nitro, cyano, trifluoromethyl and hydroxy radicals and the like, wherein each $R_{28}$ can be a monovalent hydrocarbon radical such as alkyl, aryl, alkaryl, aralkyl and cycloalkyl radicals, with the provisos that in amino substituents such as —$N(R_{28})_2$, each $R_{28}$ taken together can also compromise a divalent bridging group that forms a heterocyclic radical with the nitrogen atom, in amido substituents such as —$C(O)N(R_{28})_2$ and —$N(R_{28})COR_{28}$, each $R_{28}$ bonded to N can also be hydrogen, and in phosphonyl substituents such as —$P(O)(R_{28})_2$, one $R_{28}$ can by hydrogen. It is to be understood that each $R_{28}$ group in a particular substituent may be the same or different. Such hydrocarbon substituent radicals could possibly in turn be substituted with a permissible substituent such as already herein outlined above.

Preferred alkylene oxides which can provide random or block oxyalkylene units in the complex hydrophobe compounds represented by formulae (i) and (ii) include alkylene oxides such as ethylene oxide, propylene oxide, 1,2-butylene oxide, 2,3-butylene oxide, 1,2- and 2,3-pentylene oxide, cyclohexylene oxide, 1,2-hexylene oxide, 1,2-octylene oxide, 1,2-decylene oxide, and higher alpha-olefin epoxides; epoxidized fatty alcohols such as epoxidized soybean fatty alcohols and epoxidized linseed fatty alcohols; aromatic epoxides such as styrene oxide and 2-methyl styrene oxide; and hydroxy- and halogen-substituted alkylene oxides such as glycidol, epichlorohydrin and epibromohydrin. The preferred alkylene oxides are ethylene oxide and propylene oxide. Also included can be hydrocarbon residues from substituted and unsubstituted cyclic esters or ethers such as oxetane and tetrahydrofuran. It is understood that the compounds represented by formulae (i) and (ii) herein can contain random and/or block oxyalkylene units as well as mixtures of oxyalkylene units. It is further understood that each $R_4$, $R_5$, $R_{10}$, $R_{13}$ and $R_{19}$ group in a particular substituent for all positive values of x, y, z, f, g and j respectively can be the same or different.

The values of x, y, z, f, g and j are not narrowly critical and can vary over a wide range. For example, the values of x, y, z, f, g and j can range from 0 to about 200 or greater, preferably from about 0 to about 100 or greater, and more preferably from about 0 to about 50 or greater. Any desired amount of alkylene oxide can be employed, for example, from 0 to about 90 weight percent or greater based on the weight of the complex hydrophobe compound.

Referring to the general formulae (i) and (ii) above, it is appreciated that when $R^1$, $R^2$, $R^7$ and/or $R^8$ are a hydrocarbon residue of formulae (iii) above, the resulting compound may include any permissible number and combination of hydrophobic groups of the dendritic or cascading type. Such compounds included in the above general formulae should be easily ascertainable by one skilled in the art. Illustrative complex hydrophobe compounds having at least one active hydrogen useful in this invention and processes for preparation thereof are disclosed in copending U.S. patent application Ser. No. 887,648, which is incorporated herein by reference.

In a preferred embodiment of this invention, the structure shown in formula (iii) can be a residue of the reaction product between epichlorohydrin and an alcohol, including those alcohols whose residues can be described by formula (iii), or a phenolic, or a mixture thereof. The structures which result can be described as complex hydrophobes of a dendritic or of a cascading nature. Pictorially, they can be described as shown below:

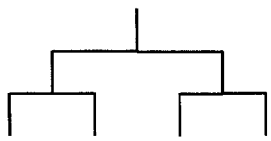

Preferred macromonomer compounds useful in this invention include those represented by the formulae:

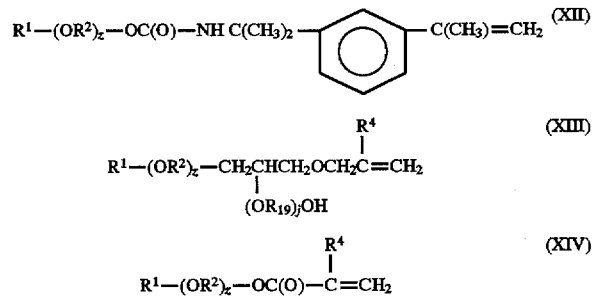

wherein $R^1$, $R^2$, $R^4$, $R^{19}$, z and j are as defined herein.

A preferred polymeric thickener of this invention conforms to the formula:

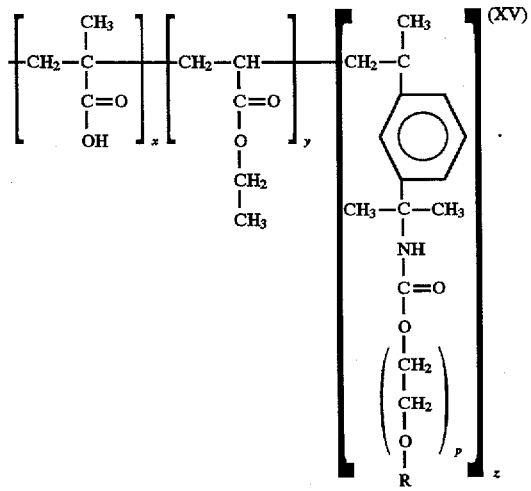

The preferred ranges are as follows: acid monomer X is 10–40%, co-polymerizable non-associative monomer Y is 10–50%, associative monomer Z is 5–30% with p equal to 20–80 moles of ethoxylation (or propoxylation). The hydrophobe R can be an alkaryl, such as nonylphenol or dinonylphenol or may have the following structure:

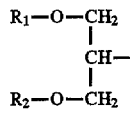

where $R_1$ and $R_2$ are as previously defined.

The macromonomer compounds useful in this invention can undergo further reaction(s) to afford desired derivatives thereof. Such permissible derivatization reactions can be carried out in accordance with conventional procedures known in the art. Illustrative derivatization reactions include, for example, esterification, etherification, alkoxylation, amination, alkylation, hydrogenation, dehydrogenation, reduction, acylation, condensation, carboxylation, oxidation, silylation and the like, including permissible combinations thereof. This invention is not intended to be limited in any manner by the permissible derivatization reactions or permissible derivatives of macromonomer compounds.

More particularly, the hydroxyl-terminated macromonomer compounds of this invention can undergo any of the known reactions of hydroxyl groups illustrative of which are reactions with acyl halides to form esters; with ammonia, a nitrile, or hydrogen cyanide to form amines; with alkyl acid sulfates to form disulfates; with carboxylic acids and acid anhydrides to form esters and polyesters; with alkali metals to form salts; with ketenes to form esters; with acid anhydrides to form carboxylic acids; with oxygen to form aldehydes and carboxylic acids; ring-opening reactions with lactones, tetrahydrofuran; dehydrogenation to form aldehydes, isocyanates to form urethanes, and the like.

The monoethylenically unsaturated macromonomer component is subject to considerable variation within the formula presented previously. The essence of the maromonomer is a complex hydrophobe carrying a polyethoxylate chain (which may include some polypropoxylate groups) and which is terminated with at least one hydroxy group. When the hydroxy-terminated polyethoxylate complex hydrophobe used herein is reacted with a monoethylenically unsaturated monoisocyanate, for example, the result is a monoethylenically unsaturated urethane in which a complex hydrophobe polyethoxylate structure is associated with a copolymerizable monoethylenic group via a urethane linkage.

The monoethylenically unsaturated compound used to provide the monoethylenically unsaturated macromonomer is subject to wide variation. Any copolymerizable unsaturation may be employed, such as acrylate and methacrylate unsaturation. One may also use allylic unsaturation, as provided by allyl alcohol. These, preferably in the form of a hydroxy-functional derivative, as is obtained by reacting a $C_2$–$C_4$ monoepoxide, like ethylene oxide, propylene oxide or butylene oxide, with acrylic or methacrylic acid to form an hydroxy ester, are reacted in equimolar proportions with an organic compound, such as toluene diisocyanate or isophorone diisocyanate. The preferred monoethylenic monoisocyanate is styryl, as in alpha, alpha-dimethyl-m-isopropenyl benzyl isocyanate. Other suitable organic compounds include, for example, monoethylenically unsaturated esters, ethers, amides, ureas, anhydrides, other urethanes and the like.

The polymers useful in this invention can be prepared via a variety of polymerization techniques known to those skilled in the art. The technique of polymerization influences the microstructure, monomer sequence distribution in the polymer backbone and its molecular weight to influence the performance of the polymer. Illustrative polymerization techniques include, for example, conventional and staged emulsion polymerization via batch, semi-continuous, or continuous processes, micellar polymerization, inverse emulsion polymerization, solution polymerization, non-aqueous dispersion polymerization, interfacial polymerization, emulsion polymerization, suspension polymerization, precipitation polymerization, addition polymerizations such as free radical, anionic, cationic or metal coordination methods, and the like.

The thickeners useful in this invention possess structural attributes of two entirely different types of thickeners (those which thicken by alkali swelling or solubilization of a polymeric entity, and those which thicken due to association), and this may account for the superior thickening properties which are obtained herein. It is believed, however, that for purposes of providing the non-Newtonian rheology which is critical to the performance of these thickeners in ADF/AAFs, it is the association among hydrophobe groups (and the wind shear-induced disassociation) which is the predominant mechanism.

The aqueous emulsion copolymerization is conventional within the skill of the art. To obtain an estimate of thickening efficiency, the product can be diluted with water to about 1% solids content and then neutralized with alkali. The usual alkali is ammonium hydroxide, but sodium and potassium hydroxide, and even amines, like triethylamine, may be used for neutralization. The neutralized product dissolves in the water to provide an increase in the viscosity. In the normal mode of addition, the unneutralized thickener is added to a fluid and then neutralized. This facilitates handling the thickener because it has a lower viscosity before neutralization. This procedure also makes more water available for formulation.

The polymers useful in this invention are typically produced by conventional aqueous emulsion polymerization techniques, using appropriate emulsifiers for emulsifying the monomers and for maintaining the polymer obtained in a suitable, dispersed condition. Commonly used anionic surfactants such as sodium lauryl sulfate, dodecylbenzene sulfonate and ethoxylated fatty alcohol sulfate can be used as emulsifiers. The emulsifier may be used in a proportion of 0.5 to 6% of the weight monomers.

Preferably, water-soluble initiators such as alkali metal or ammonium persulfate are used in amounts from 0.01 to 1.0% on the weight of monomers. A gradual addition thermal process employed at temperatures between 60° C. to 100° C. is preferred over redox systems.

The polymerization system may contain small amounts (0.01 to 5% by weight, based on monomer weight) of the chain transfer agent mercaptans such as hydroxyethyl mercaptan, β-mercaptopropionic acid and alkyl mercaptans containing from about 4 to 22 carbon atoms, and the like. The use of mercaptan modifier reduces the molecular weight of the polymer and therefore its thickening efficiency.

The polymers useful in this invention may further be modified by introducing an amount of component (D), namely, one or more polyethylenically unsaturated copolymerizable monomers effective for crosslinking, such as diallylphthalate, divinylbenzene, allyl methacrylate, trimethylol propane triacrylate, ethyleneglycol diacrylate or dimethacrylate, 1,6-hexanediol diacrylate or dimethylacrylate, diallyl benzene, and the like. Thus, from about 0.05 or less to about 20% or greater of such polyethylenically unsaturated compound based on total weight of monomer may be included in the composition forming the polymer. The resulting polymers are either highly branched or in the form of three-dimensional networks. In the neutralized salt form, those networks swell in an aqueous system to act as a highly efficient thickener.

Other illustrative polyethylenically unsaturated monomers useful in this invention include, for example, any copolymerizable compound which contains two or more nonconjugated points of ethylenic unsaturation or two or more nonconjugated vinylidene groups of the structure, $CH_2=C=$, such as divinyltoluene, trivinylbenzene, divinylnaphthalene, trimethylene glycol diacrylate or dimethacrylate, 2-ethylhexane-1,3-dimethyacrylate, divinylxylene, divinylethylbenzene, divinyl ether, divinyl sulfone, allyl ethers of polyhdric compounds such as of glycerol, pentaerythritol, sorbitol, sucrose and resorcinol, divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N-methylenediacrylamide, N,N'-methylenedimethacrylamide, N,N'-ethylidenediacrylamide and 1,2-di-(a-methyl-methylenesulfonamide)-ethylene.

Other polymers which may be useful in this invention include those polymers disclosed in copending U.S. patent application Ser. No. 887,644, copending U.S. patent application Ser. No. 887,642, copending U.S. patent application Ser. No. 887,673, copending U.S. patent application Ser. No. 887,641, copending U.S. patent application Ser. No. 887,672, and copending U.S. patent application Ser. No. 887,646, all of which are incorporated herein by reference. Polymers having a backbone containing urethane units are within the scope of this invention.

The polymer may be utilized in a variety of ways to provide the thickener or thickened compositions of this invention. For example, the polymer, while in aqueous dispersion or dry form, may be blended into an aqueous system to be thickened followed by addition of a neutralizing agent. Alternatively, the polymer may first be neutralized in aqueous dispersion form and then blended with the aqueous system. Preferably, if co-thickening by a surfactant (as discussed below) is desired, the components are separately blended (as dry components or as dispersions or slurries) into an aqueous dispersion to be thickened, followed by the neutralization step. Although aqueous concentrates of the polymer in acid form and the surfactant may be formed and added to an aqueous dispersion to be thickened as needed, followed by neutralization, such concentrates tend to be too viscous for easy handling. It is nevertheless possible to prepare either a dry blend or an aqueous, high solids composition which is sufficiently low in viscosity as to be pumpable or pourable, and then to further thicken the admixture by addition of an alkaline material.

The polymer thickener may be provided in a dry state in number of ways. For example, the unneutralized polymer may be spray or drum dried and, if desired, blended with a surfactant co-thickener. However, it is also possible to spray dry or otherwise dehydrate the neutralized polymer thickener, and then reconstitute the aqueous thickener dispersion at a future time and place by agitation in a aqueous medium, provided the pH of the dispersion is maintained at pH 7 or higher.

The more usual method of application of the dispersion of this invention for aqueous thickening is to add the aqueous dispersion of the polymer to the medium to be thickened and, after mixing, to introduce an alkaline material to neutralize the acid. The major portion of the thickening effect is obtained in a few minutes upon neutralization. In the presence of high concentrations of electrolytes, the viscosity development may take much longer. This method of applying a polymer to an aqueous system before neutralization enables one to handle a high solids thickener in a non-viscous state, to obtain a uniform blend, and then to convert to a highly viscous condition by the simple addition of an alkaline material to bring the pH of the system to 7 or above.

The aqueous solutions thickened with the neutralized polymers of this invention exhibit good viscosity stability even at a pH as high as 13.

The polymer may be used to thicken compositions under acidic conditions in the presence of a relatively large amount of surfactants wherein the thickened composition, for example, an aqueous system, has a pH below 7, even as low as 1.

An enhancement of thickening (herein termed "co-thickening") can result upon the addition of a surfactant to an aqueous system containing the polymer of this invention, when the polymer is neutralized. In some cases the thickening can be enhanced up to about 40 times the viscosity afforded by the neutralized polymer alone. A wide range of surfactants may be used. Although trace amounts of surfactant may be residually present from the polymerization of the monomers comprising the polymer (for example, whatever may remain of the about 1.5 weight percent surfactant on monomers), such amounts of surfactant are not alone believed to result in any significant co-thickening.

On the basis of an aqueous system containing about 0.1 to 5% by weight of polymer solids, a useful amount of surfactant for optimum co-thickening is about 0.1 to 1.0% by weight of the total system. As indicated, the amounts of polymer and surfactant cothickener may vary widely, even outside these ranges, depending on polymer and surfactant type and other components of the aqueous system to be thickened. However, the co-thickening can reach a maximum as surfactant is added and then decreases as more surfactant is added. Hence, it may be uneconomical to employ surfactant in amounts outside the stated concentrations and polymer/surfactant ratios, but this can be determined in a routine manner in each case.

The preferred method of application of the polymer and the surfactant for aqueous thickening is to add in any sequence the polymer and the surfactant to the medium to be thickened and, after mixing, to introduce an alkaline material to neutralize the acid. This method of applying polymer and surfactant to an aqueous system before neutralization enables one to handle a high solids thickener in a non-viscous state, to obtain a uniform blend, and then to convert to a highly viscous condition by the simple addition of an alkaline material to bring the pH of the system to 7 or above. However, the polymer in the aqueous system may also be neutralized before addition of the surfactant.

The surfactants which may be used preferably include nonionics and anionics, singly or in combination, the selection necessarily depending upon compatibility with other ingredients of the thickened or thickenable dispersions of this invention. Cationic and amphoteric surfactants may also be used, provided they are compatible with the polymer and other ingredients of the aqueous system, or are used in such small amounts as not to cause incompatibility.

Suitable anionic surfactants that may be used include the higher fatty alcohol sulfates such as the sodium or potassium salt of the sulfates of alcohols having from 8 to 18 carbon atoms, alkali metal salts or amine salts of high fatty acid having 8 to 18 carbon atoms, and sulfonated alkyl aryl compounds such as sodium dodecyl benzene sulfonate.

Examples of nonionic surfactants include alkylphenoxypolyethoxyethanols having alkyl groups of about 7 to 18 carbon atoms and about 9 to 40 or more oxyethylene units such as octylphenoxy- polyethoxyethanols, dodecylphenoxypolyethoxyethanols; ethylene oxide derivatives of long-chain carboxylic acids, such as lauric, myristic, palmitic, oleic; ethylene oxide condensates of long-chain alcohols such as lauryl or cetyl alcohol, and the like.

Examples of cationic surfactants include lauryl pyridinium chloride, octylbenzyltrimethyl- ammonium chloride, dodecyltrimethylammonium chloride condensates of primary fatty amines and ethylene oxide, and the like.

The foregoing and numerous other useful nonionic, anionic, cationic, and amphoteric surfactants are described in the literature, such as McCutcheon's Detergents & Emulsifiers 1981 Annual, North America Edition, MC Publishing Company, Glen Rock, N.J. 07452, U.S.A., incorporated herein by reference.

In general, solvents (or mixtures of solvents, other organics and volatiles) can be used to manipulate the viscosity of polymer-containing systems. In the examples herein, it is interesting to note how mineral spirits act like co-thickener, and how the water solubility of the other solvent influences how much mineral spirits can be added before the solution separates into a two phase system.

The amount of the polymer that may be dissolved in any given aqueous composition may fall within a wide range depending on the particular viscosity desired.

Thus, although any effective amount of the polymer may be employed for dissolution, typically from about 0.05 to about 20%, preferably from about 0.1 to about 5%, and most preferably from about 0.1 to about 3% by weight, based on the weight of the final aqueous composition including polymer is used.

In addition to the macromonomer-containing polymer that functions as a thickener for the fluid, the glycol- or glycerin-based fluid may also contain small amounts of other functional ingredients, such as corrosion inhibitors, surfactants, anti-oxidants, flame retardants, stabilizers, dyes, and the like. These components are ordinarily present in individual amounts of less than about 2 weight %, typically in the range of about 0.01–1 weight % for each component.

The macromonomer-containing polymer used as a thickener in the universal fluids of this invention is responsible for their advantageous properties as aircraft anti-icing fluids. The macromonomer-containing polymer is employed in amounts that effect a significant modification in the rheological properties of the glycol-based fluids. The deicing/anti-icing fluids of this invention do not exhibit rheological properties associated with conventional Newtonian fluids.

The universal fluids of this invention, furthermore, should be distinguished from conventionally thickened deicing/anti-icing fluids because they operate by an associative mechanism. The glycol-based deicing/anti-icing fluid of U.S. Pat. No. 4,358,389, thickened with a crosslinked polyacrylate and optionally xanthan gum, is exemplary of such prior art fluids.

When applied to exposed aircraft surfaces, the fluid is sufficiently viscous and/or tacky and has sufficient structure, i.e., gel-like structure, that it tends to cling or adhere to the surfaces, even non-horizontal surfaces. A coating of sufficient thickness is formed to prevent the adherence or accretion of ice, snow, sleet, freezing rain, frost or the like on such surfaces while the aircraft is stationary or taxiing on the ground. Once the aircraft begins its takeoff run, however, the fluid readily flows off the aircraft surfaces under the influence of wind shear, before lift-off occurs. Consequently, there are no appreciable amounts of fluid present on the critical aircraft surfaces prior to the pilot's rotation of the aircraft to initiate liftoff from the runway and subsequently on the aircraft surfaces when the aircraft has become airborne. This result is highly desirable since a residual layer of anti-icing fluid on the airfoil surfaces, like traces of snow, ice, freezing rain or frost, can adversely affect the lift performance characteristics of the airfoil.

It should be noted that without the presence of the macromonomer-containing polymer thickener employed in this invention, the aqueous glycol fluid would exhibit relatively low viscosity and would tend to drain off any non-horizontal surfaces under the influence of gravity, leaving an insufficient film behind to function effectively as an anti-icing agent over an extended period of time.

The macromonomer-containing polymer thickener is employed in this invention in an amount that increases the viscosity and/or tackiness of the AF and, moreover, gives it a gel-like physical structure under zero shear or very low shear conditions.

The amount of macromonomer-containing polymer thickener in the aqueous-based fluid should be less than about 5 weight %, based on the weight of the fluid. The amount of thickener is preferably within the range of about 0.05–3 weight %, and more preferably within the range of from about 0.05–1 weight %.

When the AF containing these amounts of macromonomer-containing polymer thickener is applied to the exposed surfaces of a stationary aircraft, the gravity-induced flow of the fluid coating from non-horizontal surfaces (i.e., inclined, vertical, or the like) is greatly retarded or stopped for appreciable periods of time.

The thickened deicing/anti-icing fluid produces a coating, when applied to aircraft surfaces by conventional methods, that imparts anti-icing or antifreeze characteristics to the treated aircraft surface and minimizes the adherence or accretion of ice, snow, sleet, etc., on or to the exposed aircraft surfaces.

The apparent viscosity produced by the macromonomer-containing polymer thickener in the glycol- or glycerin-based fluids of this invention is desirably in the range of about 1,000–100,000 mPa.s, preferably 20,000–60,000 mPa.s, as measured with a Brookfield LVT/DVT viscometer at 0.3 rpm and 0°±1° C. using a #31 spindle (after 20 minutes equilibration time and 10 minutes measurement time).

Once the aircraft begins its takeoff run, but prior to rotation and lift-off, the impact of the relative wind on the airfoils and other exposed surfaces treated with AF and also mechanical vibration in the wings and other aircraft surfaces causes sufficient shear force on the AF to thin it so that it behaves like a relatively non-viscous material. It then readily drains off the airfoils and other treated aircraft surfaces.

During the aircraft's takeoff run and prior to rotation (the point at which airfoil lift is sufficient for the pilot to effect lift-off and fly the aircraft off the ground), the wind shear from the relative wind changes the rheological behavior of the fluid of this invention, causing substantial shear thinning and an appreciable decrease in its apparent viscosity that allows it to flow freely off the airfoil surfaces. The airfoil surfaces are thus not only kept free of any adhering snow or the like, but also free of thickened fluid, both of which could have a deleterious effect on the airfoil lift performance.

The macromonomer-containing polymer is used as the primary thickener in the deicing/anti-icing fluid of this invention. As noted above, however, minor amounts of other ingredients, including other thickeners, may also be present to provide additional thickening or gelling functionality or modify rheological behavior. The macromonomer-containing polymer used as the essential thickening component desirably represents at least about 80 weight % of the thickening components present; preferably, it represents in excess of about 90 weight % of the thickener employed.

The gel-forming macromonomer-containing polymers employed as thickeners in this invention exhibit the desired shear thinning characteristics described above, yet are resistant to pump and nozzle shear-induced degradation. This particular characteristic is important since deicing/anti-icing fluids are typically applied using conventional ground-based deicing equipment which incorporates a pump driven spraying system. The macromonomer-containing polymer thickened aqueous glycol-based deicing/anti-icing fluids of this invention exhibit sufficient shear thinning to be readily pumpable in conventional aircraft ground deicing equipment. (In contrast, most prior art SAE/ISO Type II aircraft deicing/anti-icing fluids typically are sensitive to shear, and thus must be transferred by positive displacement pumps or by air pressure.)

The aqueous glycol- or glycerin-based fluids of this invention are primarily intended for use as deicing/anti-icing fluids for treating stationary aircraft but may be used for general deicing purposes as well, e.g., treating automobile or vehicle windshields and other exposed surfaces.

The following are rheology modifier design variables:

(i) the structure and concentration of the associative macromonomer, including: a) the size and structure of the hydrophobe; b) the moles of alkoxylation between hydrophobe and the double bond; c) the chemical nature of the bond between the alkoxylated portion and the reactive double bond (e.g., ester, ether, or urethane linkages); and d) the structure of the double bond itself (acrylic, methacrylic, crotonic, styrenic, etc.);

(ii) the structure and concentration of acid monomer in the polymer (e.g., acrylic, methacrylic, crotonic, itaconic, etc.);

(iii) the structure and concentration of the nonassociative monomer, including monomers that cross-link the polymer during polymerization (e.g., trimethylol propane triacrylate), and those that leave cross-linkable functionality in the associative polymer without crosslinking during polymerization (e.g., 2-hydroxyethylacrylate); and (iv) the molecular weight of the polymer, as controlled by mercaptans during polymerization.

All of these parameters influence the fluid's steady shear viscosity profile, viscoelastic and extensional properties, and thickening efficiency. Parameters (ia) and (ib) control rheology by regulating the morphology, thermodynamics, and kinetics of the association junctions. Parameter (ic) controls the hydrolytic stability of the bond that connects the surfactants to the polymer backbone, as well as the ease (and cost) of the synthesis of the associative macromonomer. Parameter (id) controls the sequence of incorporation into polymer for the macromonomer, and controls the amount of reactor coagulum produced during polymerization, which determines the production viability of the polymer. Parameters (ii) and (iii) control the transition temperature (i.e., chain stiffness), hydrophobicity, and water solubility of the polymer backbone.

Because the viscosity of the fluid should not decrease substantially as water dilutes it (for improved hold-over time and water spray endurance), the association activity of the polymer should balance the loss in viscosity due to polymer dilution. Because the viscosity of the fluid should not increase substantially with drop in temperature, the hydrodynamic size of the polymer should decrease enough to compensate for the increase in viscosity of the ethylene glycol and water solvent mixture. (Hydrogen bonding among water molecules and ethylene glycol molecules doubles the viscosity of a 50/50 mixture of ethylene glycol and water as the temperature decreases from 20° C. to 0° C.)

The influence of water dilution and temperature change on the viscosity of model ADF/AAFs composed of 0.5% polymer solutions in equal weight mixtures ethylene glycol and water was tested. The results are given in Table Q below.

The water dilution experiment is essentially a titration of the polymer containing glycol solution with water that is constructed such that concentration of polymer is 0.5% when the glycol concentration reaches 50%. Compositions that contain less than 50% water by weight correspond to the "dry-out experiment," that simulates the evaporation of water; compositions that contain more than 50% water correspond to the water spray endurance test that simulates the effect of freezing rain impinging on a treated aircraft waiting on the runway. The viscosity of the solution was measured as water was added to it. Whether or not the fluid viscosity is invariant to dilution depends on the moles of ethylene oxide in the macromonomer, the concentrations of associative macromonomer, and methacrylic acid in the polymer.

The degree to which the viscosity of the model ADF/AAF depends on temperature depends also on the structure of the associative polymer. The dependence of solution viscosity on polymer coil size and concentration are often expressed in terms of empirical master correlations of the form h/μ=f (c[h]), such as the Huggins equation:

$$\frac{h}{\mu} = 1 + c[h] + K' c^2 [h]^2 + \ldots \quad (1)$$

where h is the viscosity of the polymer solution, μ is the viscosity of the solvent, c[h] is a dimensionless coil volume, and the constant K' characterizes the first effects of polymer interaction on the viscosity. The Huggins parameter K' is usually independent of polymer molecular weight for long polymer chains, and has a value of about 0.4 for polymers in good solvents without interaction effects, and a value of about 0.8 for polymers in theta solvents. Equations like Equation (1) often unify viscosity data over a broad range of molecular weights and concentration for a given dilute polymer-solvent system.

Because the solvent mixture of ethylene glycol and water increases in viscosity as temperature decreases, the contribution of the solvent to the overall viscosity of the solution can be excluded, and only the increment that the polymer contributes through its specific viscosity need be examined:

$$\frac{\left[\frac{\eta}{\mu} - 1\right]_T}{\left[\frac{\eta}{\mu} - 1\right]_{T_{ref}}} = \frac{[\eta]_T}{[\eta]_{T_{ref}}} \quad (2)$$

The instrinsic viscosity [h] depends on the hydrodynamic size of the polymer coil, which depends on polymer molecular weight, solvent quality, and temperature. Taking a ratio of intrinsic viscosity relative to that obtained at an arbitrary reference temperature $T_{ref}$ allows one to isolate the influence of temperature for a given molecular weight of polymer.

Temperature correlations for viscosity usually take the form of an Arrehnius type equation:

$$\frac{\left[\frac{\eta}{\mu} - 1\right]_T}{\left[\frac{\eta}{\mu} - 1\right]_{T_{ref}}} = \exp\left[\frac{\Delta H}{R}\left(\frac{1}{T} - \frac{1}{T_{ref}}\right)\right] \quad (3)$$

where R is the ordinary gas constant and LH the activation energy for a change in viscosity with respect to temperature. The activation energy for change provides a quantitative number to compare the influence of temperature to change the viscosity of an anti-icing fluid: if LH is zero, the viscosity of the solution changes exactly in the same way as the solvent does; if LH is greater than zero, then the polymer coil expands, and the solution viscosity increases as temperature increases; if LH is less than zero, then the polymer coil contracts, and the solution viscosity decreases as temperature decreases. LH is determined by fitting the temperature dependence of the specific viscosity for 0.5% polymer solutions in a 50/50 ethylene glycol/water solvent mixture to equation (3) by a standard least squares method.

Whether or not the fluid viscosity is invariant to temperature depends on the concentration of associative macromonomer in the polymer, the moles of ethylene oxide in the macromonomer, and the concentration of carboxylic moieties in the polymer. If a particular macromonomer-containing polymer structure is found to be unacceptably sensitive to dilution and/or thermal effects (which tend to be inversely related to each other), compensation may be attempted by altering the water solubility and glass transition temperature of the polymer backbone. Thus, for instance, ethyl acrylate may be partially replaced with methyl acrylate.

The co-thickening interaction of polymer thickener with nonionic surfactant can provide shear-thinning, yet nearly temperature invariant viscosity profile. In the past, this effect was achieved through formulation with anionic surfactants. Nonionic surfactant systems have the advantage of being able to use carbon steel tanks for storage purposes.

Although the prior art describes SAE/ISO Type II anti-icing fluids with extended protection times against ice, snow, slush and frost, those fluids found limited use as deicing fluids because the protection time afforded tended to be decreased by heating for several days at the 75°–95° C. temperatures encountered in deicing operations.

At about 75°–95° C. the thickeners based on high molecular weight polymers, such as polyacrylates or polysacchardides, such as xanthan gum, tend to degrade over several days, losing viscosity, particularly the viscosity as measured at low shear rates. Because this viscosity at low shear rate helps to provide the anti-icing protection, the protection times of these fluids are degraded with time as they are heated in deicing operations.

Even the macromonomer-based thickeners described in this invention can be degraded at elevated temperatures (greater than about 60° C.) if the proper type and level of base is not used to prevent this degradation. Although we do not intend to be bound by theory, it is proposed that this degradation occurs by the hydrolysis of the macromonomer to a form that is less efficient as a thickener.

As previously mentioned, by using an alkali metal hydroxide, and in particular, sodium hydroxide, to bring the solution pH to at least about 7.5, and preferably to a pH of about 8.5 to 9.5, it has been observed that the thermal stability, as measured by the change in viscosity at low shear, has been greatly enhanced. Higher pHs actually further improve the thermal stability of the fluid, but higher pH fluids are more corrosive to aluminum, and thus are preferably avoided.

By using the salt of an alkali metal hydroxide and a weak acid, in combination with the proper base, it has been observed that the thermal stability of the fluid viscosity has been further enhanced. In particular, it was observed that sodium acetate works well with sodium hydroxide. The sodium acetate is an even weaker base, and thus it is theorized, tends to cause even less hydrolysis than sodium hydroxide alone. However, low levels of the stabilizing salt are preferred because higher levels (even though they further improve thermal stability) tend to diminish the protection times of the fluid when used in the anti-icing mode. Preferred stabilizing salt levels are 0 to about 0.10% by weight, with 0 to about 0.02% being more preferred.

As used herein, the term "complex hydrophobe" is contemplated to include all permissible hydrocarbon compounds having 2 or more hydrophobe groups, e.g., bis-dodecylphenyl, bis-nonylphenyl, bis-octylphenyl and the like.

For purposes of this invention, the term "hydrocarbon" is contemplated to include all permissible compounds having at least one hydrogen and one carbon atom. In a broad aspect, the permissible hydrocarbons include acyclic and cyclic, branched and unbranched, carbocyclic and heterocyclic, aromatic and nonaromatic organic compounds, which can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, amino, aminoalkyl, halogen and the like in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds.

The invention is illustrated more specifically with reference to the following examples.

EXAMPLE 1

Preparation of 1,3-Bis(nonylphenoxy)-2-propanol

To a five neck, two liter, round bottom flask equipped with an addition funnel, thermometer, nitrogen dispersant tube, mechanical stirrer, and a decanting head with a water-cooled condenser were added 220 grams (1.00 mole) of nonylphenol and 250 milliliters of cyclohexane. The solution was then heated to reflux and 2.8 grams (1.3 weight % based on nonylphenol) of potassium hydroxide in 10 milliliters of water was slowly added to the flask. After essentially all the water was recovered in the decanting head (10 milliliters+ 1milliliter formed), 250.7 grams (0.91 mole) of nonylphenyl glycidyl ether was added dropwise. During the addition of the glycidyl ether, the reaction temperature was maintained between 60° and 80° C. After the addition was complete, the solution was refluxed for four hours. The contents of the flask were then washed with a five percent aqueous solution of phosphoric acid, and the organic layer was separated from the water layer and washed twice with deionized water. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 425 grams of a pale-yellow liquid. End-group MW analysis gave a molecular weight of 506.8 (theoretical MW=496.8). Ir and nmr spectra were identical to previously recorded spectra for the compound.

EXAMPLE 2

Preparation of 1,3-Bis(nonylphenoxy)-2-propanol

To a five neck, two liter round bottom flask, equipped with an addition funnel, thermometer, nitrogen dispersant tube, mechanical stirrer, and a decanting head with a water-cooled condenser, were added 300 milliliters of cyclohexane and 451.7 grams (2.05 mole) of nonylphenol. The solution was then heated to reflux and 58.9 grams (1.05 mole) of potassium hydroxide in 60 milliliters of water was slowly added via the addition funnel. After essentially all the water was recovered in the decanting head (60 milliliter+19 milliliters formed), the reaction was cooled to 40° C., and 92.5 grams (1.00 mole) of epichlorohydrin was slowly added. During the addition, the reaction temperature was maintained below 60° C. by controlling the rate of epichlorohydrin addition. After all the epichlorohydrin was added, the solution was allowed to stir for one hour, and then brought to reflux for an additional three hours. The reaction mixture was then filtered under vacuum through a steam-jacketed Buchner funnel to remove the potassium chloride formed as a by-product. The filtration process was performed a total of three times to remove the majority of the salts. The reaction mixture was then placed in a one liter, round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 275 grams of a pale-yellow liquid. End-group MW analysis gave a molecular weight of 459.7 (theoretical MW=496.8). Ir and nmr spectra were identical to previously recorded spectra for the compound.

EXAMPLE 3

Preparation of 5 Mole Ethoxylate of 1,3-Bis(nonylphenoxy)-2-propanol

To a 500 milliliter, stainless steel, high pressure autoclave was charged 200 grams (0.40 mole) of 1,3-bis (nonylphenoxy)-2-propanol, which contained a catalytic amount of the potassium salt of the alcohol as described in Example 1. After purging the reactor with nitrogen, the alcohol was heated to 130° C. with stirring, and 86.9 grams (2.0 moles of ethylene oxide was added over a two hour period. The reaction temperature and pressure were maintained from 130° C. to 140° C. and 60 psig during the course of the reaction. After the addition of ethylene oxide was complete, the reaction mixture was held at 140° C. for an additional hour to allow all the ethylene oxide to cook out. The reaction mixture was dumped while hot, under nitrogen, and neutralized with acetic add to yield 285 grams of a pale-yellow liquid.

EXAMPLE 4

Preparation of Adduct of Nonylphenyl Glycidyl Ether and 5 Mole Ethoxylate of 1,3-Bis(nonylphenoxy)-2-propanol To a five neck, one liter, round bottom flask equipped as in Example 1 was added 119.8 grams (0.17 mole) of the 5 mole ethoxylate of 1,3-bis(nonylphenoxy)-2-propanol and 100 milliliters of cyclohexane. The mixture was refluxed (100° C.) for one hour to remove residual water, and then cooled to 50° C. under nitrogen to add 0.5 grams of BF$_3$/Et$_2$O. Nonylphenyl glycidyl ether (46.0 grams, 0.17 mole) was then added to the flask over a one hour period, and the reaction was heated to reflux. After three hours at reflux, the reaction mixture was transferred to a separatory funnel, while hot, and washed with a saturated aqueous solution of sodium bicarbonate. The organic layer was separated from the water layer, and washed twice with hot, deionized water. The washes were performed at 50° C. to facilitate the separation of the two layers. The water and cyclohexane were then evaporated from the organic layer, under vacuum, to yield 145 grams of a pale-yellow, viscous liquid. End-group molecular weight analysis gave a molecular weight of 880 (theoretical molecular weight=993).

EXAMPLE 5

Preparation of Poly(nonylphenol glycidyl ether)

To a 500 milliliter round bottom equipped with an overhead stirrer, nitrogen inlet, reflux condenser, additional funnel, and temperature controller was charged 1.9 grams of ethanol (22 mmoles) and 200 grams of cyclohexane. The solution was brought to 50° C. Once heated, 0.5 milliliters (4 mmoles) of BF$_3$/Et$_2$O was added using a 2 milliliter syringe. Once the acid was added, 100.0 grams of nonylphenol glycidyl ether (362 mmoles) was added dropwise so as to maintain a reaction temperature of 45° C. to 55° C. Once the glycidyl ether was added, the solution is refluxed for 3 hours, then cooled to about 50° C.

While hot (<60° C.) the organic was transferred to a separatory funnel and was washed once with 100 milliliters of 5% sodium bicarbonate solution. The aqueous layer was drained and the organic was washed two more times with 100 milliliter portions of deionized water. The aqueous layers were decanted and the organic was dried for at least 1 hour over magnesium sulfate. Once dry, the magnesium sulfate was filtered from the organic layer, which was stripped of solvent using a rotary evaporator. The final yield of viscous polymer was 100 grams. The GPC molecular weight was Mw=2600 and the Mn=1700 based on monodisperse polystyrene standards.

EXAMPLE 6

Ethoxylation of Poly(nonylphenol glycidyl ether)

To a 500 milliliter stainless steel Zipperclave was added 60.0 grams (0.035 moles based on an approximate molecular weight of 1700 gram/mole) of the resin prepared in Example 5 along with 0.5 gram of potassium hydroxide. The vessel was attached to an automated ethoxylation unit and was heated to 50° C. The vessel was continuously purged with nitrogen for 15 minutes and was then heated to 100° C. where it was again continuously purged with nitrogen for another 15 minutes. The vessel was then heated to 140° C. and was given a series of 6 purges by pressuring the vessel up to 80 psi, and then venting. Once the venting process was complete, the vessel was pressured to 20 psi with nitrogen.

The ethylene oxide lines were opened to a pair of motor-controlled valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through the motor-controlled valves. The feed was allowed to continue until 60.0 grams of ethylene oxide (1.362 moles) was added based on a difference weight of the feed cylinder. After the feed was complete, the reaction was allowed to continue for 1 hour, after which the vessel was cooled to 60° C., purged 4 times with nitrogen to 80 psi and was dumped to a container. The final product yield was 115 grams with a theoretical yield of 120 grams. The GPC molecular weight of the product was Mw=3550 and the MN=2930 based on monodisperse polystyrene standards.

EXAMPLE 7

Preparation Of Poly(phenyl glycidyl ether)

To a 500 milliliter, round bottom flask equipped with an overhead stirrer, nitrogen inlet, reflux condenser, addition funnel, and temperature controller was charged 47.06 grams of phenol (500 mmoles) and 100 grams of toluene. The solution was brought to 50° C. Once heated, 1.0 milliliter (8 mmoles) of BF$_3$/Et$_2$O was added using a 2 milliliter syringe. Once the acid was added, 68.18 grams of phenyl glycidyl ether (454 mmoles) was added dropwise so as to maintain a reaction temperature of 45° C. to 55° C. Once the glycidyl ether was added, the solution was refluxed for 3 hours, then cooled to about 50° C.

While hot (<60° C.) the organic was transferred to a separatory funnel and was washed once with 100 milliliters of 5% sodium bicarbonate solution. The aqueous layer was drained and the organic was washed two more times with 100 milliliter portions of deionized water. The aqueous layers were decanted and the organic was dried for at least 1 hour over magnesium sulfate. Once dry, the magnesium sulfate was filtered from the organic layer which was stripped of solvent using a rotary evaporator. The final yield of viscous polymer was 90.3 grams (with 11% unreacted phenol). The GPC molecular weight was Mw=470 and the Mn=310 (on average a trimer) based on monodisperse polystyrene standards.

EXAMPLE 8

Preparation of 1,3-Bis(phenoxy)-2-propanol using the Cascading Polyol Technique

To a 1 liter, round bottom flask equipped with an overhead stirrer, nitrogen inlet, reflux condenser, addition funnel, and temperature controller was charged 94.11 grams of phenol (1 mole), 12.86 grams of tetraethylammonium iodide (0.05 moles), 3.00 grams of water (0.17 moles), 42.08 grams of potassium hydroxide (0.75 moles), and 250 grams of toluene. To a 100 milliliter additional funnel was charged 23.13 grams of epichlorohydrin (0.25 moles) and 50 grams of toluene. The solution was brought to 65° C., at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliters portions of deionized water. The aqueous layers were drained off, and the toluene was removed along with unreacted phenol using a rotary evaporator. The final yield of product was 64.5 grams which was 106% of theory (residual is phenol). Final product purity was about 95% as shown by GPC.

EXAMPLE 9

Dimerization of 1,3-Bis(phenoxy)-2-propanol using the Cascading Polyol Technique To a 250 milliliter round bottom flask equipped with an overhead stirrer, nitrogen inlet, reflux condenser, additional funnel, and temperature controller was charged 20.03 grams of 1,3-bis-(phenoxy)-2-propanol prepared in Example 8 (82 mmoles), 2.06 grams of tetraethylammonium iodide (8 mmoles), 0.49 grams of water (27 mmoles), 6.51 grams of potassium hydroxide (116 mmoles), and 125 grams of toluene. To a 100 milliliter addition funnel was charged 3.61 grams of epichlorohydrin (39 mmoles) and 25 grams of toluene. The solution was brought to 65° C., at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliter portions of deionized water. The aqueous layers were drained off, and the toluene was removed using a rotary evaporator. The final yield of product was 21.6 grams which was 101% of theory. GPC showed two major components of the product. The first was the starting material at about 41% (Mn=220) and the second was the coupled product at about 59% (Mn=520).

EXAMPLE 10

Preparation of 1,3-Bis(hexadecyloxy)-2-propanol using the Cascading Polyol Technique To a 500 milliliter, round bottom flask equipped with an overhead stirrer, nitrogen inlet, reflux condenser, additional funnel, and temperature controller was charged 60.61 grams of hexadecanol (0.25 moles), 6.18 grams of tetraethylammonium iodide (0.024 moles), 1.44 grams of water (0.082 moles), 20.20 grams of potassium hydroxide (0.36 moles), and 125 grams of toluene. To a 100 milliliter addition funnel was charged 11.10 grams of epichlorohydrin (0.12 moles) and 25 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliter portions of deionized water. The aqueous layers were drained off, and the toluene was removed using a rotary evaporator. The final yield of product was 70.9 grams which is 109% of theory (residual is hexadecanol).

EXAMPLE 11

Sulfation of 1,3-Bis(nonylphenoxy)-2-propanol-block-(propylene oxide)$_{10}$-block-(ethylene oxide)$_{10}$ To a 250 milliliter, round bottom flask equipped with an overhead stirrer, a temperature controller, and a vacuum adapter was added 75.0 grams of the material from Example 13 (49 mmoles). The kettle was then evacuated to <20 mmHg and heated to 100° C. to remove any water. After 1 hour, the kettle was cooled to 60° C. while under vacuum. When reaching 60° C., vacuum was broken with nitrogen and 5.3 grams of sulfamic acid (54 mmoles) was added. After charging the sulfamic acid, the kettle was heated to 110° C. and evacuated to <20 mmHg. The reaction was allowed to proceed for 3 hours.

At the end of the hold period, the kettle was cooled to 85° C. and vacuum was broken with nitrogen. 1.2 grams of diethanolamine (11 mmoles) was slowly added under a blanket of nitrogen. This solution was stirred for 30 minutes. 10 grams of ethanol was added to the kettle and the temperature was regulated to 55° C. This solution was stirred for 30 minutes. The heat was removed from the kettle and 30 grams of water along with 20 grams of ethanol were added while maintaining good agitation. The solution was stirred for 15 minutes or until cooled to room temperature (<35° C.).

The pH was checked by dissolving 2 grams of the product solution in 18 grams of deionized water. If the pH was below 6.5, 0.2 gram increments of diethanolamine was added until the pH is between 6.5 and 7.5.

EXAMPLE 12

Preparation of 1,3-Bis(nonylphenoxy)-2-propanol-block-(propylene oxide)$_{10}$

To a 500 milliliter stainless steel Zipperclave was added 100.0 grams (0.202 mole) of 1,3-bis(nonylphenoxy)-2-propanol prepared in Example 1 along with 0.7 grams of potassium hydroxide. The vessel was attached to an automated unit and was heated to 50° C. The vessel was continuously purged with nitrogen for 15 minutes and was then heated to 100° C. where it was again continuously purged with nitrogen for another 15 minutes. The vessel was then heated to 140° C. and is given a series of 6 purges by pressuring the vessel up to 80 psi, and then venting. Once the venting process was completed, the vessel was pressured to 20 psi with nitrogen.

Lines connected to a cylinder, which had been precharged with 117.0 grams of propylene oxide (2.02 moles), were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor-controlled valves. The feed was allowed to continue until all of the propylene oxide had been fed. After the feed was complete, the reaction was allowed to continue for 1 hour after which the vessel was cooled to 60° C., purged 4 times with nitrogen to 80 psi and was dumped to a container. The final product yield was 211 grams with a theoretical yield of 277 grams. The GPC molecular weight of the product was Mw=650 and the Mn=490 based on monodisperse polystyrene standards.

EXAMPLE 13

Preparation of 1,3-Bis(nonylphenoxy)-2-propanol-block-(propylene oxide)$_{10}$-block-(ethylene oxide)$_{10}$ To a 500 milliliter stainless steel Zipperclave was added 75.0 grams of the propoxylate prepared in Example 12 (0.070 mole) along with 0.3 gram of potassium hydroxide. The vessel was attached to an automated ethoxylation unit and was heated to 50° C. The vessel was continuously purged with nitrogen for 15 minutes and was then heated to 100° C. where it was again continuously purged with nitrogen for another 15 minutes. The vessel was then heated to 140° C. and was given a series of 6 purges by pressuring the vessel up to 80 psi, and then venting. Once the venting process was completed, the vessel was pressured to 20 psi with nitrogen.

The ethylene oxide lines were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until 30.7 grams ethylene oxide (0.696 mole) was added based on a difference weight of the feed cylinder. After the feed was complete, the reaction is allowed to continue for 1 hour, after which the vessel was cooled to 60° C., purged 4 times with nitrogen to 80 psi and was dumped to a container. The final product yield was 99 grams with a theoretical yield of 106 grams.

EXAMPLE 14

Preparation of 1,3-Bis(nonylphenoxy) Adduct of 1,4-Butanediol Diglycidyl Ether

To a five neck, two liter, round bottom flask equipped with an addition funnel, thermometer, nitrogen dispersant tube, mechanical stirrer, and a decanting head with a water-cooled condenser were added 506.8 grams (2.30 moles) of nonylphenol and 350 milliliters of cyclohexane. The solution was heated to reflux, and 6.5 grams (1.3 weight percent based on nonylphenol) of potassium hydroxide in 15 milliliters of water was slowly added to the round bottom flask. After all the water was recovered in the decanting head (15 milliliters+2 milliliters formed), 220 grams (1.09 moles) of 1,4-butanediol diglycidyl ether was added dropwise between 60 and 80° C. After the addition was complete, the solution was refluxed for four hours. The contents of the flask were then washed with a five percent aqueous solution of phosphoric acid, and the organic layer was separated from the water layer and washed twice with deionized water. The reaction mixture was then placed in a one liter, round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 710 grams of a pale-yellow liquid. Molecular weight by end-group MW analysis was 689.9 (theoretical MW=643.0). Ir and nmr spectra were consistent with the expected structure of the product.

EXAMPLE 15

Preparation of 3-Mole Ethoxylate of 1,3-Bis(nonylphenoxy)-2-propanol

To a five hundred milliliter, Zipperclave reactor were charged, under nitrogen, 200.1 grams (0.43 mole) of 1,3-bis(nonylphenoxy)-2-propanol prepared in Example 2 and 0.20 gram (0.1 weight percent) of $BF_3.Et_2O$. The reaction mixture was heated to 80° C., and 55.1 grams (1.25 mole) of ethylene oxide was fed to the reactor over a two hour period. After all the ethylene oxide was fed, the reaction mixture was allowed to cook out for one hour and then dumped hot, under nitrogen, into a jar containing 160 milliliters of a one percent aqueous solution of sodium hydroxide. The organic layer was separated from the water layer and washed twice with deionized water. The washes were performed at 90° C. to facilitate the separation of the two layers. The product was then dried by azeotropic removal of the water, using cyclohexane (300 milliliters) as the entrainer. The cyclohexane was stripped off under vacuum to give a pale-yellow liquid with a molecular weight by end-group MW analysis of 601.7 (theoretical MW=629). Ir and nmr spectra were consistent with the expected structure of the product.

EXAMPLE 16

Preparation of 8-Mole Ethoxylate of Bis(nonylphenoxy) Adduct of 1,4-Butanediol Diglycidyl Ether To a five hundred milliliter Zipperclave reactor were charged, under nitrogen, 150.2 grams (0.22 mole) of bis(nonylphenoxy) adduct of 1,4-butanediol diglycidyl ether prepared in Example 14 and 0.30 grams (0.2 weight percent) of $BF_3.Et_2O$. The reaction mixture was heated to 80° C., and 77.5 grams (1.76 mole) of ethylene oxide was fed to the reactor over a two hour period. After all the ethylene oxide was fed, the reaction mixture was allowed to cook out for one hour and then dumped hot, under nitrogen, into a jar containing 160 milliliters of a one percent aqueous solution of sodium hydroxide. The organic layer was separated from the water layer and washed twice with deionized water. The washes were performed at 90° C. to facilitate the separation of the two layers. The product was then dried by azeotropic removal of the water, using cyclohexane (300 milliliters) as the entrainer. The cyclohexane was stripped off under vacuum to give a pale-yellow liquid with a molecular weight by end-group MW analysis of 1047 (theoretical MW=995). Ir and nmr spectra were consistent with the expected structure of the product.

EXAMPLE 17

Preparation of Macromonomer Compound

Into a 1 liter, round bottom reaction flask equipped with a heating mantle, dean stark trap, condenser, thermometer, nitrogen bubbler, nitrogen purge line and stirrer was charged 300 grams of toluene and 63 grams of a surfactant identified as S-1 in Table A below. With nitrogen purge, the resulting solution was heated to reflux at approximately 110° C. and azeotroped to remove trace water to dryness. The solution was subsequently cooled to 90° C., and 1.5 grams of bismuth hex chem 28% bismuth octoate catalyst (Mooney Chemical, Inc., Cleveland, Ohio) was charged and allowed to mix well, after which a stoichiometric amount of 95% m-TMI aliphatic isocyanate (American Cyanamid, Stamford, Conn.) was charged. After the reaction proceeded at 90° C. for 1.3 hours, the resulting product was cooled to 70° C. and 0.03 gram of 2,6-di-tert-4-methyl phenol (BHT) preservative was added. The mixture was poured into a stainless steel pan with large surface area to facilitate drying. The final product was a waxy material, and is designated herein as macromonomer M-1.

TABLE A $R_1-O-CH_2$
$|$
$CH-(OCH_2CH_2)_xOCH_2CH_2OH$
$|$
$R_2$ $R_2$ = hydrogen or a $R_3-O-CH_2-$ residue.

| Surfactant | $R_1$ | $R_2/R_3$ | Moles of Ethoxylation |
|---|---|---|---|
| S-1 | Nonylphenol | Hydrogen ($R_2$) | 40 |
| S-2 | Nonylphenol | Nonylphenol ($R_3$) | 40 |
| S-3 | Nonylphenol | Nonylphenol ($R_3$) | 20 |
| S-4 | Nonylphenol | Octylphenol ($R_3$) | 20 |
| S-5 | Nonylphenol | Octylphenol ($R_3$) | 40 |
| S-6 | Nonylphenol | Nonylphenol ($R_3$) | 80 |
| S-7 | Nonylphenol | Nonylphenol ($R_3$) | 120 |

EXAMPLES 18–34

Preparation of Macromonomer Compounds

In a manner similar to that described in Example 17, other macromonomers were prepared using stoichiometric amounts of the surfactants and unsaturated compounds identified in Table B below.

TABLE B

| Example No. | Surfactant | Unsaturated Compound | Macromonomer Designation |
|---|---|---|---|
| 18 | S-2 | m-TMI | M-2 |
| 19 | S-3 | m-TMI | M-3 |
| 20 | S-4 | m-TMI | M-4 |
| 21 | S-5 | m-TMI | M-5 |
| 22 | S-6 | m-TMI | M-6 |
| 23 | S-7 | m-TMI | M-7 |
| 24 | S-2 | Isocyanato Ethyl Methacrylate | M-8 |
| 25 | S-5 | Isocyanato Ethyl Methacrylate | M-9 |
| 26 | S-1 | Methacrylic Anhydride | M-10 |
| 27 | S-2 | Methacrylic Anhydride | M-11 |
| 28 | S-5 | Methacrylic Anhydride | M-12 |
| 29 | S-6 | Methacrylic Anhydride | M-13 |
| 30 | S-2 | Acrylic Anhydride | M-14 |
| 31 | S-5 | Acrylic Anhydride | M-15 |
| 32 | S-6 | Acrylic Anhydride | M-16 |
| 33 | S-2 | Crotonic Anhydride | M-17 |
| 34 | S-5 | Maleic Anhydride | M-18 |

EXAMPLE 35

Preparation of Alkali-Soluble Thickener.

A monomer mixture (300 grams) was prepared by charging ethyl acrylate (Aldrich), methacrylic acid (Aldrich), macromonomer M-1, 13 grams of a 75% solution of Aerosol® OT surfactant (American Cyanamid, Stamford, Conn.), and 3 grams of distilled deionized water to a bottle, and dispersing the contents with vigorous shaking. The ethyl acrylate, methacrylic acid and macromonomer M-1 were added in amounts identified in Table C below. A catalyst feed mixture comprised of 0.53 gram of sodium persulfate (Aldrich).and 52.47 grams of water was prepared in another container. To a 2 liter resin flask that had been immersed in a thermostated water bath and equipped with a 4-bladed stainless steel mechanical stirrer, Claisen connecting tube, water condenser, nitrogen sparge and bubble trap, thermometer and monomer and catalyst addition inlets, 1.20 grams of the sodium salt of vinyl sulfonic acid and 658.5 grams of water were charged. The monomer mixture was charged to a 1-liter graduated monomer feed cylinder, and the catalyst solution was charged to a 125 milliliter graduated catalyst feed cylinder. Under nitrogen purge, the reactor was heated to 70° C., whereupon 33 milliliters of the monomer mixture and 3 milliliters of the catalyst feed mixture were charged to the reaction vessel. The reaction vessel was subsequently heated to 80° C. After allowing the monomers to react for 20 minutes to form a seed product, the monomer and catalyst feed mixtures were conveyed to the reaction vessel by FMI pumps via ⅛" Teflon tubing at a rate of 1.94 and 0.27 milliliters/minute, respectively, under continuous stirring at a reaction temperature held between 76°–82° C. The reaction was allowed to proceed for another hour, after which the product was cooled and filtered with a 200 mesh nylon cloth. The coagulum was collected from the reaction vessel and filter cloth. Thickening ability of the resulting product was monitored by Brookfield viscosity at 6 rpm by diluting the latex to 0.25%, 0.50% and 0.75% solids, and subsequently neutralizing the product to pH=9.0 with a 95% solution of 2-amino-2-methyl-1-propanol (AMP-95, Angus Chemical Company). The results are given in Table C.

EXAMPLES 36–131

Preparation of Alkali-Soluble Thickeners

In a manner similar to that described in Example 35, other alkali-soluble thickeners were prepared using the monomers identified in Tables C–J below in the amounts identified in Tables C–J. Table C illustrates the influence of m-TMI-containing macromonomer concentration and ethoxylation on thickening efficiency. Table D illustrates the influence of mixing m-TMI-containing macromonomers of various ethoxylations on thickening efficiency. Table E illustrates the influence of unsaturation type of urethane-containing macromonomers on thickening efficiency. Table F illustrates the influence of macromonomer ester structure and ethoxylation on thickening efficiency. Table G illustrates the influence of acid type and concentration on thickening efficiency. Table H illustrates the influence of polymer glass transition temperature and water solubility on thickening efficiency. Table I illustrates the influence of cross-linkable monomer concentration on thickening efficiency. Table J illustrates the influence of mercaptan on thickening efficiency. As used in Tables C–J below, the following abbreviations have the indicated meanings: MM=Macromonomer; EA=Ethyl Acrylate; MAA=Methacrylic Acid; AA=Acrylic Acid; MA=Methyl Acrylate; t-BA=t-Butyl Acrylate; n-BA=n-Butyl Acrylate; MMA=Methyl Methacrylate; 2-EHP=2-Ethylhexyl Propionate Mercaptan; and 2-HEA=2-Hydroxy Ethyl Acrylate.

TABLE C

| | | Thickener Composition by Weight | | | Brookfield Viscosity (CPS) @ pH = 9.0 | | | Thickener |
|---|---|---|---|---|---|---|---|---|
| Ex. | Macromonomer | % MM | % EA | % MAA | 0.25% | 0.50% | 0.75% | Designation |
| 35 | M-1 | 10 | 50 | 40 | 90 | 380 | 1,000 | P-1 |
| 36 | M-2 | 5 | 55 | 40 | 270 | 11,400 | 103,600 | P-2 |
| 37 | M-2 | 10 | 50 | 40 | 120 | 3,100 | 60,000 | P-3 |
| 38 | M-2 | 10 | 50 | 40 | 105 | 10,400 | 130,000 | P-3a |
| 39 | M-2 | 20 | 40 | 40 | 25 | 2,150 | 50,500 | P-4 |
| 40 | M-2 | 30 | 30 | 40 | 10 | 790 | 20,000 | P-5 |
| 41 | M-3 | 5 | 55 | 40 | 390 | 2,260 | 17,900 | P-6 |
| 42 | M-3 | 6.5 | 53.5 | 40 | 142 | 1,200 | 18,500 | P-7 |
| 43 | M-3 | 10 | 50 | 40 | 220 | 3,050 | 40,000 | P-8 |
| 44 | M-3 | 20 | 40 | 40 | 75 | 2,350 | 27,500 | P-9 |
| 45 | M-4 | 10 | 50 | 40 | 242 | 4,400 | 39,000 | P-10 |
| 46 | M-5 | 10 | 50 | 40 | 45 | 7,400 | 84,000 | P-11 |
| 47 | M-5 | 20 | 40 | 40 | 34 | 4,450 | 59,000 | P-12 |
| 48 | M-6 | 5 | 55 | 40 | 460 | 25,500 | 88,000 | P-13 |
| 49 | M-6 | 10 | 50 | 40 | 105 | 39,000 | 150,000 | P-14 |

TABLE C-continued

| | | Thickener Composition by Weight | | | Brookfield Viscosity (CPS) @ pH = 9.0 | | | Thickener |
|---|---|---|---|---|---|---|---|---|
| Ex. | Macromonomer | % MM | % EA | % MAA | 0.25% | 0.50% | 0.75% | Designation |
| 50 | M-6 | 15 | 45 | 40 | 195 | 43,000 | 140,000 | P-15 |
| 51 | M-6 | 20 | 40 | 40 | 125 | 52,500 | 187,000 | P-16 |
| 52 | M-6 | 30 | 30 | 40 | 315 | 56,500 | 162,000 | P-17 |
| 53 | M-7 | 5 | 55 | 40 | 230 | 7,800 | 15,800 | P-18 |
| 54 | M-7 | 10 | 50 | 40 | 900 | 17,400 | 35,000 | P-19 |

TABLE D

| | | Thickener Composition by Weight | | | Brookfield Viscosity (CPS) @ pH = 9.0 | | | Thickener |
|---|---|---|---|---|---|---|---|---|
| Ex. | Macromonomer | % MM | % EA | % MAA | 0.25% | 0.50% | 0.75% | Designation |
| 55 | M-3:M-6 1:1 | 10 | 50 | 40 | 225 | 24,000 | 85,000 | P-20 |
| 56 | M-2:M-6 1:1 | 10 | 50 | 40 | 135 | 21,200 | 134,000 | P-21 |

TABLE E

| | | Thickener Composition by Weight | | | Brookfield Viscosity (CPS) @ pH = 9.0 | | | Thickener |
|---|---|---|---|---|---|---|---|---|
| Ex. | Macromonomer | % MM | % EA | % MAA | 0.25% | 0.50% | 0.75% | Designation |
| 57 | M-8 | 5 | 55 | 40 | 250 | 14,800 | 124,000 | P-22 |
| 58 | M-8 | 10 | 50 | 40 | 93 | 11,200 | 125,400 | P-23 |
| 59 | M-8 | 20 | 40 | 40 | 45 | 6,140 | 84,500 | P-24 |
| 60 | M-9 | 5 | 55 | 40 | 275 | 6,200 | 57,000 | P-25 |
| 61 | M-9 | 10 | 50 | 40 | 250 | 10,100 | 80,000 | P-26 |
| 62 | M-9 | 20 | 40 | 40 | 90 | 7,800 | 90,000 | P-27 |
| 63 | M-9 | 30 | 30 | 40 | 45 | 5,200 | 69,000 | P-28 |

TABLE F

| | | Thickener Composition by Weight | | | Brookfield Viscosity (CPS) @ pH = 9.0 | | | Thickener |
|---|---|---|---|---|---|---|---|---|
| Ex. | Macromonomer | % MM | % EA | % MAA | 0.25% | 0.50% | 0.75% | Designation |
| 64 | M-10 | 10 | 50 | 40 | 130 | 285 | 410 | P-29 |
| 65 | M-11 | 10 | 50 | 40 | 190 | 19,500 | 152,000 | P-30 |
| 66 | M-11 | 20 | 40 | 40 | 120 | 13,500 | 146,000 | P-31 |
| 67 | M-11 | 30 | 30 | 40 | 96 | 8,000 | 73,000 | P-32 |
| 68 | M-12 | 5 | 55 | 40 | 260 | 5,400 | 51,000 | P-33 |
| 69 | M-12 | 10 | 50 | 40 | 175 | 9,200 | 71,000 | P-34 |
| 70 | M-12 | 20 | 40 | 40 | 100 | 7,400 | 77,000 | P-35 |
| 71 | M-12 | 30 | 30 | 40 | 62 | 4,500 | 63,000 | P-36 |
| 72 | M-13 | 5 | 55 | 40 | 320 | 25,600 | 79,000 | P-37 |
| 73 | M-13 | 10 | 50 | 40 | 97 | 28,000 | 125,000 | P-38 |
| 74 | M-13 | 20 | 40 | 40 | 300 | 58,200 | 171,000 | P-39 |
| 75 | M-13 | 30 | 30 | 40 | 730 | 63,000 | 163,000 | P-40 |
| 76 | M-14 | 10 | 50 | 40 | 410 | 22,700 | 130,000 | P-41 |
| 77 | M-14 | 20 | 40 | 40 | 1225 | 44,500 | 168,000 | P-42 |
| 78 | M-14 | 30 | 30 | 40 | 1010 | 42,500 | 180,000 | P-43 |
| 79 | M-15 | 5 | 55 | 40 | 84 | 1,680 | 29,000 | P-44 |
| 80 | M-15 | 10 | 50 | 40 | 350 | 12,000 | 83,000 | P-45 |
| 81 | M-15 | 20 | 40 | 40 | 220 | 24,500 | 122,000 | P-46 |
| 82 | M-15 | 30 | 30 | 40 | 1050 | 33,000 | 133,000 | P-47 |
| 83 | M-16 | 5 | 55 | 40 | 450 | 17,720 | 45,300 | P-48 |
| 84 | M-16 | 10 | 50 | 40 | 1,345 | 27,000 | 98,000 | P-49 |
| 85 | M-16 | 20 | 40 | 40 | 3,450 | 65,800 | 158,000 | P-50 |
| 86 | M-16 | 30 | 30 | 40 | 11,600 | 81,000 | 157,000 | P-51 |
| 87 | M-17 | 10 | 50 | 40 | 410 | 12,000 | 60,000 | P-52 |
| 88 | M-17 | 20 | 40 | 40 | 255 | 10,600 | 46,300 | P-53 |
| 89 | M-17 | 30 | 30 | 40 | 38 | 2,525 | 13,500 | P-54 |
| 90 | M-18 | 5 | 55 | 40 | 100 | 810 | 3,500 | P-55 |

TABLE F-continued

| | | Thickener Composition by Weight | | | Brookfield Viscosity (CPS) @ pH = 9.0 | | | Thickener |
|---|---|---|---|---|---|---|---|---|
| Ex. | Macromonomer | % MM | % EA | % MAA | 0.25% | 0.50% | 0.75% | Designation |
| 91 | M-18 | 10 | 50 | 40 | 110 | 1,420 | 5,940 | P-56 |
| 92 | M-18 | 20 | 40 | 40 | 30 | 870 | 2,425 | P-57 |

TABLE G

| | | Thickener Composition by Weight | | | | Brookfield Viscosity (CPS) @ pH = 9.0 | | | Thickener |
|---|---|---|---|---|---|---|---|---|---|
| Ex. | Macromonomer | % MM | % EA | % MAA | Other | 0.25% | 0.50% | 0.75% | Designation |
| 93 | M-2 | 10 | 60 | 30 | 0 | 1520 | 12,200 | 102,000 | P-58 |
| 94 | M-2 | 10 | 70 | 20 | 0 | 45 | 3,800 | 50,000 | P-59 |
| 95 | M-2 | 10 | 80 | 10 | 0 | <10 | <10 | <10 | P-60 |
| 96 | M-2 | 10 | 60 | 0 | 30 | <10 | 95 | 6,800 | P-61 |
| 97 | M-6 | 20 | 60 | 20 | 0 | 15 | 13,500 | 43,500 | P-62 |
| 98 | M-6 | 5 | 65 | 30 | 0 | 210 | 13,000 | 56,500 | P-63 |
| 99 | M-6 | 10 | 60 | 30 | 0 | 77 | 24,000 | 88,000 | P-64 |
| 100 | M-6 | 20 | 50 | 30 | 0 | 17 | 7,600 | 79,000 | P-65 |
| 101 | M-6 | 5 | 45 | 50 | 0 | 130 | 7,060 | 28,000 | P-66 |
| 102 | M-6 | 10 | 40 | 50 | 0 | 86 | 16,700 | 52,500 | P-67 |
| 103 | M-6 | 20 | 30 | 50 | 0 | 130 | 28,000 | 122,000 | P-68 |
| 104 | M-11 | 10 | 70 | 0 | 20 | <10 | 213 | 7300 | P-69 |
| 105 | M-17 | 10 | 50 | 20 | 20 | 710 | 16,500 | 66,000 | P-70 |

TABLE H

| | | Thickener Composition by Weight | | | | Brookfield Viscosity (CPS) @ pH = 9.0 | | | Thickener |
|---|---|---|---|---|---|---|---|---|---|
| Ex. | Macromonomer | % MM | % EA | % MAA | % Other | 0.25% | 0.50% | 0.75% | Designation |
| 106 | M-2 | 10 | 40 | 40 | 10 MMA | 90 | 5,760 | 82,000 | P-71 |
| 107 | M-2 | 10 | 30 | 40 | 20 MMA | 15 | 1,125 | 55,000 | P-72 |
| 108 | M-2 | 10 | 20 | 40 | 30 MMA | 10 | 207 | 6,000 | P-73 |
| 109 | M-2 | 10 | 0 | 40 | 50 MMA | <10 | <10 | <10 | P-74 |
| 110 | M-2 | 10 | 30 | 40 | 20 styrene | 20 | 310 | 1,330 | P-75 |
| 111 | M-2 | 10 | 40 | 40 | 10 styrene | 95 | 7,540 | 75,500 | P-76 |
| 112 | M-2 | 10 | 40 | 40 | 10 n-BA | 220 | 13,800 | 118,000 | P-77 |
| 113 | M-2 | 10 | 30 | 40 | 20 n-BA | 185 | 7,400 | 66,500 | P-78 |
| 114 | M-2 | 10 | 40 | 40 | 10 t-BA | 130 | 10,100 | 100,000 | P-79 |
| 115 | M-2 | 10 | 30 | 40 | 20 t-BA | 125 | 7,200 | 77,500 | P-80 |
| 116 | M-2 | 10 | 40 | 40 | 10 MA | 100 | 6,900 | 121,000 | P-81 |
| 117 | M-2 | 10 | 30 | 40 | 20 MA | 73 | 5,000 | 90,000 | P-82 |
| 118 | M-6 | 20 | 30 | 40 | 10 MMA | 33 | 15,400 | 150,000 | P-83 |

TABLE I

| | | Thickener Composition by Weight | | | | Brookfield Viscosity (CPS) @ pH = 9.0 | | | Thickener |
|---|---|---|---|---|---|---|---|---|---|
| Ex. | Macromonomer | % MM | % EA | % MAA | % 2-HEA | 0.25% | 0.50% | 0.75 | Designation |
| 119 | M-2 | 10 | 47.7 | 40 | 2.3 | 97 | 9,060 | 127,000 | P-84 |
| 120 | M-2 | 10 | 57.7 | 30 | 2.3 | 62 | 6,300 | 76,000 | P-85 |
| 121 | M-2 | 20 | 37.5 | 40 | 2.5 | 27 | 6,200 | 116,600 | P-86 |
| 122 | M-2 | 20 | 35 | 40 | 5 | <10 | 260 | 18,600 | P-87 |
| 123 | M-2 | 20 | 32.5 | 40 | 7.5 | 20 | 720 | 40,000 | P-88 |
| 124 | M-2 | 20 | 30 | 40 | 10 | 10 | 520 | 29,500 | P-89 |

TABLE J

| | | Thickener Composition by Weight | | | | Brookfield Viscosity (CPS) @ pH = 9.0 | | | Thickener |
|---|---|---|---|---|---|---|---|---|---|
| Ex. | Macromonomer | % MM | % EA | % MAA | % 2-HEP* | 0.25% | 0.50% | 0.75% | Designation |
| 125 | M-2 | 10 | 40 | 50 | .05 | 165 | 22,800 | 142,000 | P-90 |
| 126 | M-2 | 10 | 50 | 40 | 0.2 | 18 | 2,060 | 66,500 | P-91 |
| 127 | M-2 | 10 | 50 | 40 | 0.3 | <10 | 115 | 9,700 | P-92 |
| 128 | M-2 | 10 | 50 | 40 | 0.5 | <10 | 12 | 355 | P-93 |
| 129 | M-2 | 10 | 50 | 40 | 1 | <10 | <10 | <10 | P-94 |
| 130 | M-6 | 10 | 50 | 40 | .05 | 230 | 23,700 | 90,700 | P-95 |
| 131 | M-6 | 10 | 50 | 40 | .2 | 30 | 5,170 | 33,000 | P-96 |

*% charged to reactor based on monomer.

EXAMPLES 132–187

Co-Thickening with Surfactants

The addition of certain surfactants to an associative polymer solution produces a co-thickening effect. The results in Table L below show the co-thickening effect produced by the addition with thorough mixing of certain surfactants identified in Table K below in the amounts identified in Table L to a 0.5% alkaline solution of an alkali soluble thickener identified in Table L as measured with a Brookfield Viscometer at 6 rpm at pH=9.0.

TABLE K $$R_1-O-CH_2$$
$$|$$
$$CH-(OCH_2CH_2)_xOCH_2CH_2OH$$
$$|$$
$$R_2$$

$R_2$ = hydrogen or a $R_3-O-CH_2-$ residue.

| Surfactant | $R_1$ | $R_2/R_3$ | Moles of Ethoxylation |
|---|---|---|---|
| S-8 | Nonylphenol | Nonylphenol ($R_3$) | 20 |
| S-9 | Nonylphenol | Nonylphenol ($R_3$) | 40 |
| S-10 | Nonylphenol | Nonylphenol ($R_3$) | 80 |
| S-11 | Nonylphenol | Hydrogen ($R_2$) | 25 |
| S-12 | Nonylphenol | Hydrogen ($R_2$) | 40 |
| S-13 | Nonylphenol | Octylphenol ($R_3$) | 20 |
| S-14 | Nonylphenol | Octylphenol ($R_3$) | 40 |
| S-15* | Nonylphenol | Nonylphenol ($R_3$) | 40 |
| S-16 | Octylphenol | Hydrogen ($R_2$) | 25 |

*Sulfated derivative.

TABLE L

| Example | Surfactant | Surfactant Concentration (weight, %) | Thickener | Brookfield Viscosity (cps) @ pH = 9.0 |
|---|---|---|---|---|
| 132 | S-8 | 0.0 | P-3 | 3100 |
| | S-8 | 0.2 | P-3 | 32700 |
| | S-8 | 0.4 | P-3 | 45700 |
| | S-8 | 0.8 | P-3 | 63300 |
| | S-8 | 1.0 | P-3 | 65500 |
| | S-8 | 2.0 | P-3 | >100000 |
| 133 | S-9 | 0.2 | P-3 | 24200 |
| | S-9 | 0.4 | P-3 | 18700 |
| | S-9 | 0.8 | P-3 | 6600 |
| | S-9 | 1.0 | P-3 | 4060 |
| | S-9 | 2.0 | P-3 | 1225 |
| 134 | S-10 | 0.2 | P-3 | 20600 |
| | S-10 | 0.4 | P-3 | 17300 |
| | S-10 | 0.8 | P-3 | 8500 |
| | S-10 | 1.0 | P-3 | 6300 |
| | S-10 | 2.0 | P-3 | 1850 |
| 135 | S-11 | 0.2 | P-3 | 12000 |
| | S-11 | 0.4 | P-3 | 3160 |
| | S-11 | 0.8 | P-3 | 700 |
| | S-11 | 1.0 | P-3 | 485 |
| | S-11 | 2.0 | P-3 | 480 |
| 136 | S-12 | 0.2 | P-3 | 9200 |
| | S-12 | 0.4 | P-3 | 4500 |
| | S-12 | 0.8 | P-3 | 1000 |
| | S-12 | 1.0 | P-3 | 875 |
| | S-12 | 2.0 | P-3 | 565 |
| 137 | S-13 | 0.2 | P-3 | 34300 |
| | S-13 | 0.4 | P-3 | 26700 |
| | S-13 | 0.8 | P-3 | 11500 |
| | S-13 | 1.0 | P-3 | 8600 |
| | S-13 | 2.0 | P-3 | 2450 |
| 138 | S-14 | 0.2 | P-3 | 22200 |
| | S-14 | 0.4 | P-3 | 17200 |
| | S-14 | 0.8 | P-3 | 6900 |
| | S-14 | 1.0 | P-3 | 4500 |
| | S-14 | 2.0 | P-3 | 1500 |
| 139 | S-15 | 0.2 | P-3 | 10500 |
| | S-15 | 0.4 | P-3 | 4940 |
| | S-15 | 0.8 | P-3 | 2160 |

TABLE L-continued

| Example | Surfactant | Surfactant Concentration (weight, %) | Thickener | Brookfield Viscosity (cps) @ pH = 9.0 |
|---|---|---|---|---|
| | S-15 | 1.0 | P-3 | 1450 |
| | S-15 | 2.0 | P-3 | 355 |
| 140 | S-16 | 0.2 | P-3 | 14300 |
| | S-16 | 0.4 | P-3 | 4080 |
| | S-16 | 0.8 | P-3 | 1075 |
| | S-16 | 1.0 | P-3 | 735 |
| | S-16 | 2.0 | P-3 | 485 |
| 141 | S-8 | 0.0 | P-2 | 11400 |
| | S-8 | 0.2 | P-2 | 23500 |
| | S-8 | 0.4 | P-2 | 34000 |
| | S-8 | 0.8 | P-2 | 64000 |
| | S-8 | 1.0 | P-2 | 71000 |
| | S-8 | 2.0 | P-2 | 93000 |
| 142 | S-9 | 0.2 | P-2 | 11000 |
| | S-9 | 0.4 | P-2 | 4000 |
| | S-9 | 0.8 | P-2 | 2000 |
| | S-9 | 1.0 | P-2 | 1400 |
| | S-9 | 2.0 | P-2 | 850 |
| 143 | S-10 | 0.2 | P-2 | 10500 |
| | S-10 | 0.4 | P-2 | 5000 |
| | S-10 | 0.8 | P-2 | 2000 |
| | S-10 | 1.0 | P-2 | 1600 |
| | S-10 | 2.0 | P-2 | 950 |
| 144 | S-11 | 0.2 | P-2 | 2700 |
| | S-11 | 0.4 | P-2 | 1000 |
| | S-11 | 0.8 | P-2 | 800 |
| | S-11 | 1.0 | P-2 | 660 |
| | S-11 | 2.0 | P-2 | 620 |
| 145 | S-12 | 0.2 | P-2 | 2800 |
| | S-12 | 0.4 | P-2 | 1000 |
| | S-12 | 0.8 | P-2 | 850 |
| | S-12 | 1.0 | P-2 | 660 |
| | S-12 | 2.0 | P-2 | 650 |
| 146 | S-8 | 0.0 | P-4 | 2150 |
| | S-8 | 0.2 | P-4 | 19000 |
| | S-8 | 0.4 | P-4 | 31000 |
| | S-8 | 0.8 | P-4 | 55000 |
| | S-8 | 1.0 | P-4 | 61000 |
| | S-8 | 2.0 | P-4 | 85000 |
| 147 | S-9 | 0.2 | P-4 | 19500 |
| | S-9 | 0.4 | P-4 | 21500 |
| | S-9 | 0.8 | P-4 | 11500 |
| | S-9 | 1.0 | P-4 | 7400 |
| | S-9 | 2.0 | P-4 | 2250 |
| 148 | S-10 | 0.2 | P-4 | 12600 |
| | S-10 | 0.4 | P-4 | 17400 |
| | S-10 | 0.8 | P-4 | 12600 |
| | S-10 | 1.0 | P-4 | 6600 |
| | S-10 | 2.0 | P-4 | 2600 |
| 149 | S-11 | 0.2 | P-4 | 17400 |
| | S-11 | 0.4 | P-4 | 7800 |
| | S-11 | 0.8 | P-4 | 1650 |
| | S-11 | 1.0 | P-4 | 860 |
| | S-11 | 2.0 | P-4 | 560 |
| 150 | S-12 | 0.2 | P-4 | 14600 |
| | S-12 | 0.4 | P-4 | 7800 |
| | S-12 | 0.8 | P-4 | 1500 |
| | S-12 | 1.0 | P-4 | 960 |
| | S-12 | 2.0 | P-4 | 450 |
| 151 | S-8 | 0.0 | P-5 | 790 |
| | S-8 | 0.2 | P-5 | 4600 |
| | S-8 | 0.4 | P-5 | 19600 |
| | S-8 | 0.8 | P-5 | 42000 |
| | S-8 | 1.0 | P-5 | 50000 |
| | S-8 | 2.0 | P-5 | 90000 |
| 152 | S-9 | 0.2 | P-5 | 5800 |
| | S-9 | 0.4 | P-5 | 13200 |
| | S-9 | 0.8 | P-5 | 9200 |
| | S-9 | 1.0 | P-5 | 5200 |
| | S-9 | 2.0 | P-5 | 1600 |
| 153 | S-10 | 0.2 | P-5 | 4050 |
| | S-10 | 0.4 | P-5 | 10400 |
| | S-10 | 0.8 | P-5 | 9400 |
| | S-10 | 1.0 | P-5 | 5000 |
| | S-10 | 2.0 | P-5 | 1600 |
| 154 | S-11 | 0.2 | P-5 | 10600 |
| | S-11 | 0.4 | P-5 | 4200 |
| | S-11 | 0.8 | P-5 | 1400 |
| | S-11 | 1.0 | P-5 | 970 |
| | S-11 | 2.0 | P-5 | 410 |
| 155 | S-12 | 0.2 | P-5 | 6000 |
| | S-12 | 0.4 | P-5 | 4200 |
| | S-12 | 0.8 | P-5 | 1150 |
| | S-12 | 1.0 | P-5 | 600 |
| | S-12 | 2.0 | P-5 | 340 |
| 156 | S-8 | 0 | P-7 | 1200 |
| | S-8 | 0.2 | P-7 | 9000 |
| | S-8 | 0.4 | P-7 | 21000 |
| | S-8 | 0.8 | P-7 | 37000 |
| | S-8 | 1.0 | P-7 | 49000 |
| | S-8 | 2.0 | P-7 | 78000 |
| 157 | S-9 | 0.2 | P-7 | 1600 |
| | S-9 | 0.4 | P-7 | 1350 |
| | S-9 | 0.8 | P-7 | 900 |
| | S-9 | 1.0 | P-7 | 762 |
| | S-9 | 2.0 | P-7 | 565 |
| 158 | S-10 | 0.2 | P-7 | 1100 |
| | S-10 | 0.4 | P-7 | 1150 |
| | S-10 | 0.8 | P-7 | 900 |
| | S-10 | 1.0 | P-7 | 823 |
| | S-10 | 2.0 | P-7 | 650 |
| 159 | S-11 | 0.2 | P-7 | 1175 |
| | S-11 | 0.4 | P-7 | 685 |
| | S-11 | 0.8 | P-7 | 503 |
| | S-11 | 1.0 | P-7 | 495 |
| | S-11 | 2.0 | P-7 | 502 |
| 160 | S-12 | 0.2 | P-7 | 950 |
| | S-12 | 0.4 | P-7 | 675 |
| | S-12 | 0.8 | P-7 | 525 |
| | S-12 | 1.0 | P-7 | 500 |
| | S-12 | 2.0 | P-7 | 480 |
| 161 | S-8 | 0.0 | P-13 | 25500 |
| | S-8 | 0.2 | P-13 | 31500 |
| | S-8 | 0.4 | P-13 | 46500 |
| | S-8 | 0.8 | P-13 | 60000 |
| | S-8 | 1.0 | P-13 | 60000 |
| | S-8 | 2.0 | P-13 | 62500 |
| 162 | S-9 | 0.2 | P-13 | 8640 |
| | S-9 | 0.4 | P-13 | 2940 |
| | S-9 | 0.8 | P-13 | 1200 |
| | S-9 | 1.0 | P-13 | 1000 |
| | S-9 | 2.0 | P-13 | 750 |
| 163 | S-10 | 0.2 | P-13 | 10100 |
| | S-10 | 0.4 | P-13 | 4200 |
| | S-10 | 0.8 | P-13 | 1450 |
| | S-10 | 1.0 | P-13 | 1300 |
| | S-10 | 2.0 | P-13 | 900 |
| 164 | S-12 | 0.2 | P-13 | 2540 |
| | S-12 | 0.4 | P-13 | 1125 |
| | S-12 | 0.8 | P-13 | 750 |
| | S-12 | 1.0 | P-13 | 670 |
| | S-12 | 2.0 | P-13 | 610 |
| 165 | S-8 | 0.0 | P-14 | 39000 |
| | S-8 | 0.2 | P-14 | 61000 |
| | S-8 | 0.4 | P-14 | 73500 |
| | S-8 | 0.8 | P-14 | 87000 |
| | S-8 | 1.0 | P-14 | 93500 |
| | S-8 | 2.0 | P-14 | 122000 |
| 166 | S-9 | 0.2 | P-14 | 41000 |
| | S-9 | 0.4 | P-14 | 13700 |
| | S-9 | 0.8 | P-14 | 6200 |
| | S-9 | 1.0 | P-14 | 3500 |
| | S-9 | 2.0 | P-14 | 1200 |
| 167 | S-10 | 0.2 | P-14 | 38200 |
| | S-10 | 0.4 | P-14 | 20500 |
| | S-10 | 0.8 | P-14 | 7300 |
| | S-10 | 1.0 | P-14 | 5400 |
| | S-10 | 2.0 | P-14 | 1950 |
| 168 | S-12 | 0.2 | P-14 | 13000 |
| | S-12 | 0.4 | P-14 | 4300 |

TABLE L-continued

| Example | Surfactant | Surfactant Concentration (weight, %) | Thickener | Brookfield Viscosity (cps) @ pH = 9.0 |
|---|---|---|---|---|
| | S-12 | 0.8 | P-14 | 975 |
| | S-12 | 1.0 | P-14 | 950 |
| | S-12 | 2.0 | P-14 | 660 |
| 169 | S-8 | 0.0 | P-16 | 52500 |
| | S-8 | 0.2 | P-16 | 95000 |
| | S-8 | 0.4 | P-16 | 92000 |
| | S-8 | 0.8 | P-16 | 122000 |
| | S-8 | 1.0 | P-16 | 125000 |
| | S-8 | 2.0 | P-16 | 138000 |
| 170 | PS-9 | 0.2 | P-16 | 73500 |
| | PS-9 | 0.4 | P-16 | 53000 |
| | PS-9 | 0.8 | P-16 | 25000 |
| | PS-9 | 1.0 | P-16 | 21000 |
| | PS-9 | 2.0 | P-16 | 5400 |
| 171 | S-10 | 0.2 | P-16 | 52800 |
| | S-10 | 0.4 | P-16 | 34500 |
| | S-10 | 0.8 | P-16 | 5400 |
| | S-10 | 1.0 | P-16 | 2925 |
| | S-10 | 2.0 | P-16 | 775 |
| 172 | S-13 | 0.2 | P-16 | 45800 |
| | S-13 | 0.4 | P-16 | 54000 |
| | S-13 | 0.8 | P-16 | 50800 |
| | S-13 | 1.0 | P-16 | 54500 |
| | S-13 | 2.0 | P-16 | 63000 |
| 173 | S-14 | 0.2 | P-16 | 22700 |
| | S-14 | 0.4 | P-16 | 2480 |
| | S-14 | 0.8 | P-16 | 710 |
| | S-14 | 1.0 | P-16 | 532 |
| | S-14 | 2.0 | P-16 | 415 |
| 174 | S-8 | 0.0 | P-29 | 285 |
| | S-8 | 0.2 | P-29 | 285 |
| | S-8 | 0.4 | P-29 | 360 |
| | S-8 | 0.8 | P-29 | 477 |
| | S-8 | 1.0 | P-29 | 505 |
| | S-8 | 2.0 | P-29 | 837 |
| 175 | S-9 | 0.2 | P-29 | 282 |
| | S-9 | 0.4 | P-29 | 285 |
| | S-9 | 0.8 | P-29 | 284 |
| | S-9 | 1.0 | P-29 | 298 |
| | S-9 | 2.0 | P-29 | 322 |
| 176 | S-10 | 0.2 | P-29 | 272 |
| | S-10 | 0.4 | P-29 | 278 |
| | S-10 | 0.8 | P-29 | 285 |
| | S-10 | 1.0 | P-29 | 297 |
| | S-10 | 2.0 | P-29 | 315 |
| 177 | S-12 | 0.2 | P-29 | 267 |
| | S-12 | 0.4 | P-29 | 279 |
| | S-12 | 0.8 | P-29 | 298 |
| | S-12 | 1.0 | P-29 | 311 |
| | S-12 | 2.0 | P-29 | 320 |
| 178 | S-8 | 0.0 | P-30 | 19500 |
| | S-8 | 0.2 | P-30 | 79000 |
| | S-8 | 0.4 | P-30 | 71200 |
| | S-8 | 0.8 | P-30 | 81000 |
| | S-8 | 1.0 | P-30 | 89500 |
| | S-8 | 2.0 | P-30 | 175000 |
| 179 | S-9 | 0.2 | P-30 | 52000 |
| | S-9 | 0.4 | P-30 | 35500 |
| | S-9 | 0.8 | P-30 | 16500 |
| | S-9 | 1.0 | P-30 | 15600 |
| | S-9 | 2.0 | P-30 | 5620 |
| 180 | S-10 | 0.2 | P-30 | 47200 |
| | S-10 | 0.4 | P-30 | 26300 |
| | S-10 | 0.8 | P-30 | 20300 |
| | S-10 | 1.0 | P-30 | 13400 |
| | S-10 | 2.0 | P-30 | 4700 |
| 181 | S-12 | 0.2 | P-30 | 23000 |
| | S-12 | 0.4 | P-30 | 6840 |
| | S-12 | 0.8 | P-30 | 3125 |
| | S-12 | 1.0 | P-30 | 1750 |
| | S-12 | 2.0 | P-30 | 1225 |
| 182 | S-8 | 0.0 | P-46 | 24500 |
| | S-8 | 0.2 | P-46 | 79000 |
| | S-8 | 0.4 | P-46 | 75000 |
| | S-8 | 0.8 | P-46 | 86000 |
| | S-8 | 1.0 | P-46 | 95000 |
| | S-8 | 2.0 | P-46 | 150000 |
| 183 | S-9 | 0.2 | P-46 | 40500 |
| | S-9 | 0.4 | P-46 | 31000 |
| | S-9 | 0.8 | P-46 | 15300 |
| | S-9 | 1.0 | P-46 | 9400 |
| | S-9 | 2.0 | P-46 | 2300 |
| 184 | S-11 | 0.2 | P-46 | 20000 |
| | S-11 | 0.4 | P-46 | 7300 |
| | S-11 | 0.8 | P-46 | 1350 |
| | S-11 | 1.0 | P-46 | 900 |
| | S-11 | 2.0 | P-46 | 380 |
| 185 | S-13 | 0.2 | P-46 | 63500 |
| | S-13 | 0.4 | P-46 | 42000 |
| | S-13 | 0.8 | P-46 | 23000 |
| | S-13 | 1.0 | P-46 | 16000 |
| | S-13 | 2.0 | P-46 | 4850 |
| 186 | S-14 | 0.2 | P-46 | 36000 |
| | S-14 | 0.4 | P-46 | 25000 |
| | S-14 | 0.8 | P-46 | 11000 |
| | S-14 | 1.0 | P-46 | 9300 |
| | S-14 | 2.0 | P-46 | 1900 |
| 187 | S-16 | 0.2 | P-46 | 19000 |
| | S-16 | 0.4 | P-46 | 9300 |
| | S-16 | 0.8 | P-46 | 1250 |
| | S-16 | 1.0 | P-46 | 750 |
| | S-16 | 2.0 | P-46 | 290 |

EXAMPLES 188–232

Co-Thickening with Surfactants.

The degree of ethoxylation of a surfactant added to an associative polymer solution influences the co-thickening effect. The results in Table N below show the co-thickening effect produced by the addition with thorough mixing of certain surfactants identified in Table M below in the amounts identified in Table N to a 0.3% (Examples 172–189), 0.5% (Examples 190–215) or 0.75% (Example 216) alkaline solution of an alkali soluble thickener identified in Table N as measured with a Brookfield Viscometer at 6 rpm at pH=9.0.

$$R_1-O-CH_2$$
$$|$$
$$CH-(OCH_2CH_2)_xOCH_2CH_2OH$$
$$|$$
$$R_2$$

$R_2$ = hydrogen or a $R_3-O-CH_2-$ residue.

TABLE M

| Surfactant | $R_1$ | $R_2/R_3$ | Moles of Ethoxylation |
|---|---|---|---|
| S-17 | Nonylphenol | Hydrogen ($R_2$) | 4 |
| S-18 | Nonylphenol | Hydrogen ($R_2$) | 6 |
| S-19 | Nonylphenol | Hydrogen ($R_2$) | 7 |
| S-20 | Nonylphenol | Hydrogen ($R_2$) | 8 |
| S-21 | Nonylphenol | Hydrogen ($R_2$) | 9 |
| S-22 | Nonylphenol | Hydrogen ($R_2$) | 10 |
| S-23 | Nonylphenol | Hydrogen ($R_2$) | 15 |
| S-24 | Nonylphenol | Hydrogen ($R_2$) | 25 |
| S-25 | Nonylphenol | Hydrogen ($R_2$) | 40 |
| S-26 | Octylphenol | Hydrogen ($R_2$) | 1 |
| S-27 | Octylphenol | Hydrogen ($R_2$) | 3 |
| S-28 | Octylphenol | Hydrogen ($R_2$) | 5 |
| S-29 | Octylphenol | Hydrogen ($R_2$) | 7 |

TABLE M-continued

| Surfactant | R₁ | R₂/R₃ | Moles of Ethoxylation |
|---|---|---|---|
| S-30 | Octylphenol | Hydrogen (R₂) | 9 |
| S-31 | Octylphenol | Hydrogen (R₂) | 12 |
| S-32 | Octylphenol | Hydrogen (R₂) | 16 |
| S-33 | C11–C15 Secondary Alcohol | Hydrogen (R₂) | 5 |
| S-34 | C11–C15 Secondary Alcohol | Hydrogen (R₂) | 9 |

TABLE N

| Example | Surfactant | Surfactant Concentration (weight, %) | Thickener | Brookfield Viscosity (cps) @ pH = 9.0 |
|---|---|---|---|---|
| 188 | S-17 | 0.8 | P-1 | 890 |
| 189 | S-18 | 0.8 | P-1 | 1340 |
| 190 | S-19 | 0.8 | P-1 | 630 |
| 191 | S-20 | 0.8 | P-1 | 205 |
| 192 | S-21 | 0.8 | P-1 | 143 |
| 193 | S-22 | 0.8 | P-1 | 113 |
| 194 | S-23 | 0.8 | P-1 | 85 |
| 195 | S-24 | 0.8 | P-1 | 57 |
| 196 | S-25 | 0.8 | P-1 | 68 |
| 197 | S-17 | 0.8 | P-3 | 17800 |
| 198 | S-18 | 0.8 | P-3 | 35800 |
| 199 | S-19 | 0.8 | P-3 | 21300 |
| 200 | S-20 | 0.8 | P-3 | 820 |
| 201 | S-21 | 0.8 | P-3 | 230 |
| 202 | S-22 | 0.8 | P-3 | 147 |
| 203 | S-23 | 0.8 | P-3 | 118 |
| 204 | S-24 | 0.8 | P-3 | 82 |
| 205 | S-25 | 0.8 | P-3 | 77 |
| 206 | S-17 | 0.8 | P-42 | 57000 |
| 207 | S-18 | 0.8 | P-42 | 134000 |
| 208 | S-19 | 0.8 | P-42 | 112000 |
| 209 | S-21 | 0.8 | P-42 | 2450 |
| 210 | S-22 | 0.8 | P-42 | 800 |
| 211 | S-23 | 0.8 | P-42 | 3250 |
| 212 | S-26 | 0.8 | P-42 | 43000 |
| 213 | S-27 | 0.8 | P-42 | 37000 |
| 214 | S-28 | 0.8 | P-42 | 71000 |
| 215 | S-29 | 0.8 | P-42 | 5800 |
| 216 | S-30 | 0.8 | P-42 | 375 |
| 217 | S-31 | 0.8 | P-42 | 650 |
| 218 | S-32 | 0.8 | P-42 | 2400 |
| 219 | S-17 | 0.8 | P-46 | 68000 |
| 220 | S-18 | 0.8 | P-46 | 13000 |
| 221 | S-19 | 0.8 | P-46 | 88000 |
| 222 | S-21 | 0.8 | P-46 | 2900 |
| 223 | S-22 | 0.8 | P-46 | 1400 |
| 224 | S-23 | 0.8 | P-46 | 2400 |
| 225 | S-26 | 0.8 | P-46 | 25000 |
| 226 | S-27 | 0.8 | P-46 | 38500 |
| 227 | S-28 | 0.8 | P-46 | 77000 |
| 228 | S-29 | 0.8 | P-46 | 7200 |
| 229 | S-30 | 0.8 | P-46 | 550 |
| 230 | S-31 | 0.8 | P-46 | 690 |
| 231 | S-32 | 0.8 | P-46 | 1775 |
| 232 | Aerosol® OT | 0.0 | P-4 | 50500 |
|  | Aerosol® OT | 0.1 | P-4 | 93500 |
|  | Aerosol® OT | 0.2 | P-4 | 42000 |
|  | Aerosol® OT | 0.4 | P-4 | 11200 |
|  | Aerosol® OT | 0.8 | P-4 | 3700 |
|  | Aerosol® OT | 1.0 | P-4 | 7200 |
|  | Aerosol® OT | 2.0 | P-4 | 10600 |

EXAMPLES 233–245

Co-Thickening with Solvents and Non-Solvents

Solvents and non-solvents added to an associative polymer solution influence the co-thickening effect. The results in Table P below show the co-thickening effect produced by the addition with thorough mixing of certain solvents and non-solvents identified in Table O below in the amounts identified in Table P to a 0.75% alkaline solution of an alkali-soluble thickener identified in Table P as measured with a Brookfield Viscometer at 6 rpm at pH=9.0.

TABLE O

| Solvent Designation | Solvent |
|---|---|
| O-1 | mineral spirits |
| O-2 | butanol |
| O-3 | Isobutanol |
| O-4 | Isopropanol |
| O-5 | 2-Ethylhexanol |
| O-6 | Butyl Carbitol |
| O-7 | Butyl DiPropasol |
| O-8 | Butyl Propasol |
| O-9 | Propyl DiPropasol |
| O-10 | Propyl Propasol |
| O-11 | Methyl DiPropasol |
| O-12 | Methyl Propasol |

TABLE P

| Example | Thickener | Solvent | Solvent Concentration (weight, %) | Solvent O-1 Concentration (weight %) | Brookfield Viscosity (cps) @ pH = 9.0 |
|---|---|---|---|---|---|
| 233 | P-3 | O-6 | 5 | 0 | 29200 |
|  | P-3 | O-6 | 10 | 0 | 865 |
|  | P-3 | O-6 | 20 | 0 | 625 |
|  | P-3 | O-6 | 40 | 0 | 720 |
|  | P-3 | O-6 | 5 | 5 | 15400 |
|  | P-3 | O-6 | 10 | 5 | 1125 |
|  | P-3 | O-6 | 20 | 5 | 735 |
|  | P-3 | O-6 | 40 | 5 | 780 |
|  | P-3 | O-6 | 5 | 10 | 56500 |
|  | P-3 | O-6 | 10 | 10 | 1050 |
|  | P-3 | O-6 | 20 | 10 | 835 |
|  | P-3 | O-6 | 40 | 10 | 832 |
|  | P-3 | O-6 | 5 | 20 | 41500 |
|  | P-3 | O-6 | 10 | 20 | 1625 |
| 234 | P-3 | O-7 | 0 | 0 | 76000 |
|  | P-3 | O-7 | 5 | 0 | 2150 |
|  | P-3 | O-7 | 10 | 0 | 3700 |
|  | P-3 | O-7 | 20 | 0 | 2000 |
|  | P-3 | O-7 | 0 | 5 | 89000 |
|  | P-3 | O-7 | 5 | 5 | 88000 |
|  | P-3 | O-7 | 10 | 5 | 50000 |
|  | P-3 | O-7 | 20 | 5 | 46500 |
|  | P-3 | O-7 | 0 | 10 | 102400 |
|  | P-3 | O-7 | 5 | 10 | 122000 |
|  | P-3 | O-7 | 10 | 10 | 72000 |
|  | P-3 | O-7 | 0 | 20 | 113000 |
|  | P-3 | O-7 | 5 | 20 | 158000 |
|  | P-3 | O-7 | 10 | 20 | 138000 |
| 235 | P-3 | O-8 | 5 | 0 | 1925 |
|  | P-3 | O-8 | 10 | 0 | 1150 |
|  | P-3 | O-8 | 20 | 0 | 2000 |
|  | P-3 | O-8 | 40 | 0 | 6200 |
| 236 | P-3 | O-9 | 5 | 0 | 36000 |
|  | P-3 | O-9 | 10 | 0 | 1200 |
|  | P-3 | O-9 | 20 | 0 | 440 |
|  | P-3 | O-9 | 40 | 0 | 1375 |
| 237 | P-3 | O-10 | 5 | 0 | 1375 |
|  | P-3 | O-10 | 10 | 0 | 45500 |
|  | P-3 | O-10 | 20 | 0 | 625 |
|  | P-3 | O-10 | 40 | 0 | 510 |
| 238 | P-3 | O-11 | 5 | 0 | 36000 |
|  | P-3 | O-11 | 10 | 0 | 20500 |
|  | P-3 | O-11 | 20 | 0 | 4200 |
|  | P-3 | O-11 | 40 | 0 | 550 |
| 239 | P-3 | O-12 | 0 | 0 | 76000 |
|  | P-3 | O-12 | 5 | 0 | 45000 |
|  | P-3 | O-12 | 10 | 0 | 24500 |

TABLE P-continued

| Example | Thickener | Solvent | Solvent Concentration (weight, %) | Solvent O-1 Concentration (weight %) | Brookfield Viscosity (cps) @ pH = 9.0 |
|---|---|---|---|---|---|
| | P-3 | O-12 | 20 | 0 | 5800 |
| | P-3 | O-12 | 40 | 0 | 675 |
| | P-3 | O-12 | 5 | 5 | 51500 |
| | P-3 | O-12 | 10 | 5 | 28500 |
| | P-3 | O-12 | 20 | 5 | 7100 |
| | P-3 | O-12 | 40 | 5 | 810 |
| | P-3 | O-12 | 5 | 10 | 61200 |
| | P-3 | O-12 | 10 | 10 | 33500 |
| | P-3 | O-12 | 20 | 10 | 6400 |
| | P-3 | O-12 | 40 | 10 | 950 |
| | P-3 | O-12 | 5 | 20 | 86800 |
| | P-3 | O-12 | 10 | 20 | 40500 |
| | P-3 | O-12 | 20 | 20 | 7100 |
| | P-3 | O-12 | 40 | 20 | 1350 |
| 240 | P-14 | O-7 | 0 | 0 | 150000 |
| | P-14 | O-7 | 5 | 0 | 1350 |
| | P-14 | O-7 | 10 | 0 | 4500 |
| | P-14 | O-7 | 20 | 0 | 7000 |
| | P-14 | O-7 | 0 | 5 | 140000 |
| | P-14 | O-7 | 5 | 5 | 120000 |
| | P-14 | O-7 | 10 | 5 | 78000 |
| | P-14 | O-7 | 0 | 5 | 140000 |
| | P-14 | O-7 | 5 | 10 | 158000 |
| | P-14 | O-7 | 10 | 10 | 124000 |
| | P-14 | O-7 | 0 | 20 | 136000 |
| | P-14 | O-7 | 5 | 20 | 152000 |
| | P-14 | O-7 | 10 | 20 | 142000 |
| 241 | P-3a | O-2 | 0 | 0 | 132600 |
| | P-3a | O-2 | 5 | 0 | 17300 |
| | P-3a | O-2 | 10 | 0 | 850 |
| | P-3a | O-2 | 20 | 0 | 1425 |
| | P-3a | O-2 | 40 | 0 | 4750 |
| | P-3a | O-2 | 0 | 5 | 140000 |
| | P-3a | O-2 | 5 | 5 | 67000 |
| | P-3a | O-2 | 10 | 5 | 2500 |
| | P-3a | O-2 | 20 | 5 | 3000 |
| | P-3a | O-2 | 0 | 10 | 134000 |
| | P-3a | O-2 | 5 | 10 | 33000 |
| | P-3a | O-2 | 10 | 10 | 4000 |
| | P-3a | O-2 | 20 | 10 | 4900 |
| | P-3a | O-2 | 0 | 20 | 144000 |
| | P-3a | O-2 | 5 | 20 | 49000 |
| | P-3a | O-2 | 10 | 20 | 8000 |
| 242 | P-3a | O-3 | 5 | 0 | 28500 |
| | P-3a | O-3 | 10 | 0 | 880 |
| | P-3a | O-3 | 20 | 0 | 1425 |
| | P-3a | O-3 | 40 | 0 | 4600 |
| | P-3a | O-3 | 5 | 5 | 80000 |
| | P-3a | O-3 | 10 | 5 | 2950 |
| | P-3a | O-3 | 20 | 5 | 3200 |
| | P-3a | O-3 | 40 | 5 | 6200 |
| | P-3a | O-3 | 5 | 10 | 78000 |
| | P-3a | O-3 | 10 | 10 | 5200 |
| | P-3a | O-3 | 20 | 10 | 6400 |
| | P-3a | O-3 | 5 | 20 | 136000 |
| | P-3a | O-3 | 10 | 20 | 20500 |
| 243 | P-3a | O-4 | 5 | 0 | 94000 |
| | P-3a | O-4 | 10 | 0 | 29000 |
| | P-3a | O-4 | 20 | 0 | 1050 |
| | P-3a | O-4 | 40 | 0 | 850 |
| | P-3a | O-4 | 5 | 5 | 107400 |
| | P-3a | O-4 | 10 | 5 | 39000 |
| | P-3a | O-4 | 20 | 5 | 1225 |
| | P-3a | O-4 | 40 | 5 | 900 |
| | P-3a | O-4 | 5 | 10 | 134000 |
| | P-3a | O-4 | 10 | 10 | 41000 |
| | P-3a | O-4 | 20 | 10 | 1350 |
| | P-3a | O-4 | 40 | 10 | 1050 |
| | P-3a | O-4 | 5 | 20 | 164000 |
| | P-3a | O-4 | 10 | 20 | 33000 |
| | P-3a | O-4 | 20 | 20 | 1825 |
| | P-3a | O-4 | 40 | 20 | 1350 |
| 244 | P-3a | O-5 | 5 | 0 | 93500 |
| | P-3a | O-5 | 10 | 0 | 136000 |
| | P-3a | O-5 | 20 | 0 | 178000 |
| 245 | P-3a | O-7 | 5 | 0 | 2700 |
| | P-3a | O-7 | 10 | 0 | 6100 |
| | P-3a | O-7 | 20 | 0 | 11900 |

EXAMPLE 246

Polymer Solution Characterization For Aircraft Anti-Icing Fluids

Polymer solutions were titrated with water, and 30 RPM Brookfield viscosities (centipoise) were measured at room temperature (20° C.) and at 0° C. in a thermostated bath. The results are given in Table Q below. The polymer solutions at 0 grams added water contained 0.5% polymer solids identified in Table Q, 1:1 ethylene glycol: water solvent mixture and a pH=9.0. Negative grams water added simulates water evaporation (the "dry-out" phenomenon).

TABLE Q

| Polymer P-2 | | |
|---|---|---|
| Grams Added Water | Viscosity at @ 20° C. | Viscosity at 0° C. |
| −10 | 1260 | 2450 |
| −5 | 1100 | 2125 |
| 0 | 1000 | 1925 |
| 5 | 925 | 1750 |
| 10 | 845 | 1505 |
| 15 | 790 | 1400 |

| Grams Added Water | Viscosity at @ 20° C. | Viscosity at 0° C. |
|---|---|---|
| Polymer P-3b | | |
| −10 | 1400 | 4400 |
| −5 | 1250 | 4240 |
| 0 | 1085 | 3060 |
| 5 | 935 | 2960 |
| 10 | 900 | 2550 |
| 15 | 825 | 2100 |
| Polymer P-4 | | |
| −10 | 1475 | 5200 |
| −5 | 1225 | 4100 |
| 0 | 925 | 3000 |
| 5 | 840 | 2400 |
| 10 | 705 | 2005 |
| 15 | 522 | 1450 |
| Polymer P-5 | | |
| −10 | 503 | 2125 |
| −5 | 459 | 1415 |
| 0 | 395 | 1250 |
| 5 | 283 | 1000 |
| 10 | 230 | 865 |
| 15 | 191 | 760 |
| Polymer P-6 | | |
| −10 | 1095 | 2150 |
| −5 | 897 | 1790 |
| 0 | 853 | 1700 |
| 5 | 755 | 1475 |
| 10 | 723 | 1365 |
| 15 | 660 | 1215 |

TABLE Q-continued

| | Polymer P-8 | |
|---|---|---|
| −10 | 1390 | 3188 |
| −5 | 1175 | 2125 |
| 0 | 1060 | 1960 |
| 5 | 910 | 1900 |
| 10 | 855 | 1490 |
| 15 | 765 | 1350 |
| | Polymer P-9 | |
| −10 | 3750 | 7660 |
| −5 | 2820 | 5100 |
| 0 | 2425 | 4620 |
| 5 | 1970 | 3700 |
| 10 | 1660 | 2770 |
| 15 | 1425 | 2360 |
| | Polymer P-13 | |
| −10 | 475 | 2375 |
| −5 | 850 | 2260 |
| 0 | 810 | 2150 |
| 5 | 760 | 2025 |
| 10 | 685 | 1990 |
| 15 | 590 | 1835 |
| | Polymer P-14 | |
| −10 | 1190 | 4225 |
| −5 | 1085 | 3825 |
| 0 | 975 | 4050 |
| 5 | 940 | 3850 |
| 10 | 880 | 4225 |
| 15 | 815 | 3975 |
| | Polymer P-16 | |
| −10 | 3550 | 16700 |
| −5 | 3525 | 11540 |
| 0 | 3450 | 11520 |
| 5 | 3460 | 11900 |
| 10 | 3300 | 13200 |
| 15 | 3025 | 11400 |
| | Polymer P-17 | |
| −10 | 3575 | 13900 |
| −5 | 3900 | 13800 |
| 0 | 4000 | 13640 |
| 5 | 3865 | 13200 |
| 10 | 3675 | 12000 |
| 15 | 3500 | 11300 |
| | Polymer P-65 | |
| −10 | 650 | 2060 |
| −5 | 645 | 1815 |
| 0 | 638 | 1500 |
| 5 | 550 | 1490 |
| 10 | 483 | 1225 |
| 15 | 397 | 1050 |
| | Polymer P-68 | |
| −10 | 1370 | 8100 |
| −5 | 1450 | 8800 |
| 0 | 1550 | 7800 |
| 5 | 1635 | 8140 |
| 10 | 1525 | 7200 |
| 15 | 1550 | 7000 |
| | Polymer P-71 | |
| −10 | 975 | 2700 |
| −5 | 875 | 2100 |
| 0 | 815 | 1835 |
| 5 | 745 | 1720 |
| 10 | 625 | 1365 |
| 15 | 570 | 1225 |
| | Polymer P-81 | |
| −10 | 2130 | 6240 |
| −5 | 1780 | 5200 |
| 0 | 1560 | 4580 |
| 5 | 1365 | 4160 |
| 10 | 1210 | 3580 |
| 15 | 1070 | 3240 |
| | Polymer P-91 | |
| −10 | 95 | 215 |
| −5 | 75 | 208 |
| 0 | 84 | 206 |
| 5 | 55 | 202 |
| 10 | 54 | 175 |
| 15 | 44 | 165 |

EXAMPLE 247

Temperature Sensitivity of Polymers In Aircraft Anti-Icing Fluids

Polymer solutions were heated and 30 RPM Brookfield viscosities were measured at various temperatures in a thermostated bath. The activation energy was measured for a change in viscosity with respect to temperature. LH was determined by fitting the temperature dependence of the specific viscosity for 0.5% polymer solutions identified in Table R below in a 50/50 ethylene glycol/water solvent mixture to equation (3) herein by a standard least squares method. The results are given in Table R.

TABLE R

| Polymer | LH (KJ/mole) |
|---|---|
| P-2 | −3.3 |
| P-3b | 9.5 |
| P-4 | 14.2 |
| P-5 | 13.4 |
| P-6 | −2.1 |
| P-8 | −4.6 |
| P-9 | −3.6 |
| P-13 | 3.3 |
| P-14 | 22.5 |
| P-16 | 15.1 |
| P-17 | 15.7 |
| P-65 | 3.4 |
| P-68 | 28.8 |
| P-71 | 2.0 |
| P-81 | 10.8 |
| P-91 | 5.1 |

EXAMPLE 248

Co-Thickening in Polymer Solution Characterization for Aircraft Anti-Icing Fluids Polymer solutions were titrated with water and 30 RPM Brookfield viscosities (centipoise) were measured at room temperature (20° C.) and at 0° C. in a thermostated bath. The results are given in Table S below. The polymer solutions at 0 grams added water contained 0.5% polymer solids identified in Table S, an amount (weight percent based on total solution) of Tergitol® 15-S-5 nonionic surfactant identified in Table S, 1:1 ethylene glycol: water solvent mixture and a pH=9.0. Negative grams water added simulated water evaporation (the "dry-out" phenomenon).

TABLE S

| Grams Added Water | Viscosity at @ 20° C. | Viscosity at 0° C. |
|---|---|---|
| Polymer P-24 with No Surfactant | | |
| −10 | 1945 | 6960 |
| −5 | 1770 | 5540 |
| 0 | 1600 | 5260 |
| 5 | 1410 | 4650 |
| 10 | 1175 | 4300 |
| 15 | 1075 | 3200 |
| Polymer P-24 with 0.25% Surfactant | | |
| −10 | 15,700 | 60,000 |
| −5 | 15,360 | 57,200 |
| 0 | 14,900 | 57,800 |
| 5 | 14,500 | 57,600 |
| 10 | 13,920 | 56,000 |
| 15 | 13,200 | 52,500 |
| Polymer P-24 with 0.5% Surfactant | | |
| −10 | 22,500 | 90,500 |
| −5 | 25,500 | 91,800 |
| 0 | 25,700 | 91,000 |
| 5 | 24,000 | 77,500 |
| 10 | 22,500 | 74,000 |
| 15 | 22,200 | 67,000 |
| Polymer P-24 with 1.0% Surfactant | | |
| −10 | 52,000 | 85,000 |
| −5 | 52,700 | 92,500 |
| 0 | 49,000 | 84,500 |
| 5 | 46,600 | 90,500 |
| 10 | 40,800 | 75,600 |
| 15 | 40,000 | 69,700 |

EXAMPLE 249

Influence of Added Surfactant on the Temperature Sensitivity of Aircraft Anti-Icing Fluids Polymer solutions were heated and 30 RPM Brookfield viscosities (centipoise) were measured at various temperatures in a thermostated bath. The activation energy was measured for a change in viscosity with respect to temperature. LH was determined by fitting the temperature dependence of the specific viscosity for 0.5% polymer solutions identified in Table T below and an amount (weight percent based on total solution) of Tergitol® 15-S-5 nonionic surfactant identified in Table T in a 50/50 ethylene glycol/water solvent mixture to equation (3) herein by a standard least squares method. The results are given in Table T.

TABLE T

| Polymer | % Surfactant | LH (KJ/mole) |
|---|---|---|
| P-24 | 0 | 14.6 |
| P-24 | 0.25 | 20.1 |
| P-24 | 0.5 | 17.1 |
| P-24 | 1.0 | −6.91 |

The surfactant influences not only the magnitude of viscosity but also how sensitive viscosity is to temperature change.

EXAMPLE 250

Influence of Temperature and Surfactant on the Steady Shear Viscosity Profile of Aircraft Anti-Icing Fluids A steady shear viscosity profile was obtained with a standard Bohlin VOR rheometer equipped with a temperature control and Mooney-Couette shearing geometry. The polymer solutions contained 0.4% polymer solids identified in Table U below, a amount (weight percent based on total solution) of Tergitol® 15-S-5 nonionic surfactant identified in Table U and a 1:1 ethylene glycol: water solvent mixture. The results are given in Table U. The viscosity is given in centipoise (cps).

TABLE U

| Shear Rate | Viscosity at Temperature | | |
|---|---|---|---|
| (1/sec) | 20° C. | 0° C. | −10° C. |
| Polymer P-4 with No Surfactant | | | |
| 0.2 | 2400 | 2600 | 2700 |
| 1.0 | 1000 | 1200 | 1300 |
| 10.0 | 400 | 600 | 900 |
| Polymer P-4 with 0.1% Surfactant | | | |
| 0.2 | 9000 | 12000 | 16000 |
| 1.0 | 2300 | 4100 | 5800 |
| 10.0 | 600 | 1000 | 1200 |

EXAMPLE 251

Influence of Water Dilution, Temperature, Shear Rate and Surfactant Type and Concentration on the Steady Shear Viscosity Profile of Aircraft Anti-Icing Fluids A steady shear viscosity profile was obtained with a standard Bohlin VOR rheometer equipped with temperature control and Mooney-Couette shearing geometry. The initial fluids contained 49.75 grams of ethylene glycol (polyester grade), 38.90 grams of distilled water, 0.85 grams of latex containing 30 weight percent of P-8 polymer solids and an amount of Tergitol® NP-6 nonionic surfactant identified in Table V below. The fluids were adjusted to a pH of about 8.5 with a 45 percent aqueous solution of potassium hydroxide. The results are given in Table V. The viscosity is given in centipoise (cps).

TABLE V

| | Viscosity at Temperature and Shear Rate | | |
|---|---|---|---|
| Added Water, grams | Viscosity at 20° C., 1.0 sec⁻¹ | Viscosity at 0° C., 0.1 sec⁻¹ | Viscosity at −20° C., 10 sec⁻¹ |
| Polymer P-8 with 0.2 Grams Tergitol ® 15-S-5 Nonionic Surfactant | | | |
| 0 | 1420 | — | — |
| 5 | 1189 | — | — |
| 10 | 781 | 4582 | 864 |
| 15 | 595 | 3553 | 735 |
| 20 | 430 | 2355 | 642 |
| 25 | 362 | 1635 | 619 |
| Polymer P-8 with 0.4 Grams Tergitol ® 15-S-5 Nonionic Surfactant | | | |
| 0 | 4185 | — | — |
| 5 | 4094 | — | — |
| 10 | 3660 | 42500 | 1323 |
| 15 | 3472 | 26800 | 1182 |
| 20 | 2432 | 29280 | 998 |
| 25 | 1925 | 21190 | 858 |
| Polymer P-8 with 0.2 Grams Tergitol ® NP-6 Nonionic Surfactant | | | |
| 0 | 871 | — | — |
| 5 | 761 | — | — |
| 10 | 568 | 3373 | 871 |
| 15 | 563 | 2808 | 815 |
| 20 | 441 | 2330 | 691 |
| 25 | 370 | 1778 | 614 |

TABLE V-continued

Viscosity at Temperature and Shear Rate

| Added Water, grams | Viscosity at 20° C., 1.0 sec$^{-1}$ | Viscosity at 0° C., 0.1 sec$^{-1}$ | Viscosity at −20° C., 10 sec$^{-1}$ |
|---|---|---|---|
| Polymer P-8 with 0.4 Grams Tergitol ® NP-6 Nonionic Surfactant | | | |
| 0 | 2373 | — | — |
| 5 | 2310 | — | — |
| 10 | 1948 | 21490 | 1333 |
| 15 | 2171 | 18340 | 1217 |
| 20 | 1880 | 20360 | 1095 |
| 25 | 1707 | 17230 | 990 |

EXAMPLE 252

Influence of Polymer Type on the Steady Shear Viscosity Profile of Aircraft Anti-Icing Fluids.

A steady shear viscosity profile was obtained with a standard Bohlin VOR rheometer equipped with temperature control and Mooney-Couette shearing geometry. The fluids contained 54.0 grams of ethylene glycol (polyester grade), 46.0 grams of distilled water, an amount of latex containing 30 weight percent of P-8 or P-31 polymer solids identified in Table W below, an amount of Tergitol® 15-S-5 nonionic surfactant identified in Table W, 0.25 grams of Sandocarin 8132C corrosion inhibitor and 0.01 grams of Sag 7133 corrosion inhibitor. The fluids were adjusted to a pH of about 8.5 with a 45 percent aqueous solution of potassium hydroxide. The results are given in Table W. The viscosity is given in centipoise (cps).

TABLE W

| Latex, grams | Viscosity at 0° C., 0.1 sec$^{-1}$ | Viscosity at −20° C., 10 sec$^{-1}$ |
|---|---|---|
| Polymer P-8 with 0.3 Grams Tergitol ® 15-S-5 Nonionic Surfactant | | |
| 0.85 | 3179 | 701 |
| 0.75 | 1463 | 446 |
| Polymer P-31 with 0.3 Grams Tergitol ® 15-S-5 Nonionic Surfactant | | |
| 0.85 | 203 | 277 |
| Polymer P-31 with 0.5 Grams Tergitol ® 15-S-5 Nonionic Surfactant | | |
| 0.85 | 272 | 284 |

EXAMPLE 253

Shear Stability and Water Spray Endurance of Aircraft Anti-Icing Fluids

A shear stability test and water spray endurance test were performed by following the Association of European Airlines Anti-Icing Performance Test Specification for shear stability and water spray endurance as set forth in AEA Material Specification of De-/Anti-Icing Fluid for Aircraft, G6807/R. The fluid contained 49.75 grams of ethylene glycol (polyester grade), 38.90 grams of distilled water, 0.85 grams of latex containing 30 weight percent of P-8 polymer solids and 0.4 grams of Tergitol® 15-S-5 nonionic surfactant. The fluid was adjusted to a pH of about 8.5 with a 45 percent aqueous solution of potassium hydroxide. The results showed less than 5 percent change in viscosity and 70 minutes for water spray endurance. For the shear stability test, the rotation speed and mixing time were twice the specification value (7000 rpm rotation speed and 10 minutes mixing time).

Examples 254 through 293 illustrate the effect of neutralizing base on the thermal stability of an aircraft fluid of this invention.

In these examples, the material identified as "SAG 2001" is a proprietary organosilicon emulsion used as an antifoaming/defoaming agent, available from OSi Inc., Danbury, Conn. The material identified as "Ingredient S" is a five-mole ethoxylate of octyl phenol, available under the trademark "Triton® X-45" from Union Carbide Corp., Danbury, Conn. The material identified as "Sandocorin LF" is a proprietary corrosion inhibitor/flame retardant containing an acrylic terpolymer and about 10% by weight triethanolamine, inter alia, and is available from Clariant Corp., Charlotte, N.C. The material identified as "Thickener" is the polymer made according to Example 76 of U.S. Pat. No. 5,399,618, the disclosure of which is incorporated herein by reference. (Example 43, hereinabove, describes a closely similar material, which would not be expected to differ significantly in properties or results from the "Thickener" used in the examples below.)

Four fluids were prepared according to the following general procedure:

To a one-quart container, add:

| Ethylene Glycol | 550.96 grams |
|---|---|
| Water | 355.73 grams |

To magnetically-stirred beaker #1, add:

| Ethylene Glycol | 11.57 grams |
|---|---|
| Water | 10.36 grams |

Then, while agitating beaker #1, slowly add (in order shown):

| SAG 2001 | 0.17 gram |
|---|---|
| Thickener | 5.00 grams |
| Sandocorin LF | 1.50 grams |
| Ingredient S | 2.50 grams |

After mixing (minimum 20 minutes) to create a homogeneous slurry, transfer the material from beaker #1 to the agitated solution in the one-quart vessel.

Prepare beaker #2 exactly like #1, and add as before. Continue agitation.

To beaker #3, add:

| Ethylene Glycol | 14.47 grams |
|---|---|
| Water | 12.96 grams |
| SAG-2001 | 0.17 gram |
| Triethanolamine (TEA) | 2.50 grams |
| 45% Potassium Hydroxide | 1.00 grams |

Agitate beaker #3, then slowly transfer its contents to the one-quart vessel with agitation. Agitate the solution until homogeneous (minimum 15 minutes). This procedure provides 1000 grams of aircraft fluid.

Example #254 was prepared exactly as described above. In Example 256, KOH alone (1.35 grams of 45% solution) was used to replace the KOH/triethanolamine blend. In Example 255, 19.17 grams of triethanolamine was used to replace the KOH/triethanolamine blend. In Example 257, 1.11 grams of a 45% solution of sodium hydroxide was used to replace the KOH/triethanolamine blend.

The initial low-shear viscosity (Brookfield LVT, #31 spindle, 0.3 rpm, 0° C., small sample adapter and 10 minute time to reading) was determined for each of the fluids, then two samples of each were placed in a 70° C. oven for 30 days. The fluids were then allowed to cool to room temperature, and the low-shear viscosity was re-measured. Using that data, loss of viscosity brought about by heating was calculated for the four different neutralizing bases:

TABLE I

| Example | Neutralizing Base | % Loss of Viscosity Sample 1 | Sample 2 |
|---|---|---|---|
| 254 (Comparative) | KOH/TEA | 47.28 | 42.3 |
| 255 (Comparative) | Triethanolamine | 34.11 | 31.45 |
| 256 | KOH alone | 28.08 | 20.15 |
| 257 | NaOH alone | 14.95 | 13.21 |

Thus it is seen that using an alkali metal hydroxide, preferably sodium hydroxide, as the neutralizing base provided a fluid much more thermally stable. In addition to the low loss in viscosity, the Water Spray Endurance Time (WSET) of the fluid neutralized with sodium hydroxide was very high initially (about 150 minutes), and was reduced during the 30 days at 70° C. by only 9%. Potassium hydroxide, on the other hand, provided a significantly lower initial WSET (127 minutes) and a larger decrease (12.6%) when heated for 30 days at 70° C.

Examples 258 through 275 were done all at the same time as a designed experiment, with the purpose of determining the effect of five variables on thermal stability of aircraft fluid formulations. The procedure and materials described in Example 257 were used, and the variables studied were a) ratio of ethylene glycol to water, b) level of thickener, c) level of Sandocorin LF, d) level of Ingredient S, and e) level of NaOH, indicated as "X1," "X2," etc., respectively, in Table II. The layout of the design and the results are shown in Table II:

The number in the column marked EG/W is the ratio of ethylene glycol to water, and the numbers in the columns marked "Thickener," "LF," and "S" are the amounts, in grams, of those components going into each of the first two beaker mixes in the 1000-gram recipe, and the number in the column marked NaOH is the amount of that component going into the beaker mix in a 1000-gram batch. "HTD" refers to the fluid after heating.

The results indicate that improved thermal stability (as measured by either viscosity loss or WSET loss) is obtained by increasing the ratio of ethylene glycol to water, by using more thickener, by using less Sandocorin LF, by using less Ingredient S, and by using more NaOH (making the fluid at a higher pH). The fluid of Example 261 meets these suggested directions, and provided excellent initial protection time (WSET) as well as excellent thermal stability when measured by retention of either WSET or Brookfield viscosity.

Examples 276–281 illustrate the effect of pH on thermal stability. For these examples, Example 261, above, was repeated, except that the amount of NaOH was adjusted to achieve the pH shown in the "Before Heat" section of Table III. Thermal stability results are shown in Table III. In this Table, viscosity is given in centipoises, as measured with a Brookfield viscometer, as described above. The term "°Brix" is a measure of refractive index, obtained using a device such as an "AO 10431," manufactured by Misco Products Division, Cleveland, Ohio. This measure of refractive index is important in that it provides an easy-to-obtain measure of the ratio of glycol to water in the fluid (which determines freeze point and other important performance properties). Other devices may be used for the refractive index measurement, but the type of instrument mentioned here is particularly convenient for measurements "in the field."

TABLE II

DESIGN SET TO DEVELOP THERMALLY STABLE UNIVERSAL FLUID

| | Indep. Variables | | | | | Fluid Components | | | | | WSET | | % | Brookfield | | % | pH | | % |
|---|---|---|---|---|---|---|---|---|---|---|---|---|---|---|---|---|---|---|---|
| | X1 | X2 | X3 | X4 | X5 | EG/W | Thick | LF | S | NaOH | Orig | Htd | Loss | Orig | Htd | Loss | Orig | Htd | Loss |
| 258 | L | L | L | L | H | 0.6 | 3 | 0.5 | 2 | 1.5 | 10 | 12 | −20% | 400 | 154 | 62% | 11.15 | 10.97 | 2% |
| 259 | H | L | L | L | L | 0.7 | 3 | 0.5 | 2 | 0.5 | 43 | 24 | 44% | 13797 | 7898 | 43% | 8.53 | 8.03 | 6% |
| 260 | L | H | L | L | L | 0.6 | 6 | 0.5 | 2 | 0.5 | 14 | 13 | 7% | 2000 | 1200 | 40% | 7.27 | 6.97 | 4% |
| 261 | H | H | L | L | H | 0.7 | 6 | 0.5 | 2 | 1.5 | 163 | 154 | 6% | 35792 | 36292 | −1% | 10.46 | 9.98 | 5% |
| 262 | L | L | H | L | L | 0.6 | 3 | 2 | 2 | 0.5 | 16 | 15 | 6% | 3299 | 3399 | −3% | 7.7 | 7.6 | 1% |
| 263 | H | L | H | L | H | 0.7 | 3 | 2 | 2 | 1.5 | 10 | 11 | −10% | 125 | 120 | 4% | 10.95 | 10.66 | 3% |
| 264 | L | H | H | L | H | 0.6 | 6 | 2 | 2 | 1.5 | 106 | 101 | 5% | 45690 | 34393 | 25% | 9.29 | 8.95 | 4% |
| 265 | H | H | H | L | L | 0.7 | 6 | 2 | 2 | 0.5 | 36 | 24 | 33% | 5199 | 4299 | 17% | 7.68 | 7.32 | 5% |
| 266 | L | L | L | H | L | 0.6 | 3 | 0.5 | 3 | 0.5 | 120 | 94 | 22% | 67286 | 51289 | 24% | 8.25 | 7.99 | 3% |
| 267 | H | L | L | H | H | 0.7 | 3 | 0.5 | 3 | 1.5 | 16 | 21 | −31% | 2799 | 1800 | 36% | 11.1 | 10.9 | 2% |
| 268 | L | H | L | H | H | 0.6 | 6 | 0.5 | 3 | 1.5 | 280 | 217 | 23% | 137371 | 115975 | 16% | 10.46 | 10.1 | 3% |
| 269 | H | H | L | H | L | 0.7 | 6 | 0.5 | 3 | 0.5 | 8 | 17 | −113% | 1900 | 3399 | −79% | 6.95 | 6.75 | 3% |
| 270 | L | L | H | H | H | 0.6 | 3 | 2 | 3 | 1.5 | 6 | 10 | −67% | 500 | 155 | 69% | 11 | 10.62 | 3% |
| 271 | H | L | H | H | L | 0.7 | 3 | 2 | 3 | 0.5 | 3 | 2 | 33% | 600 | 141 | 77% | 6.8 | 6.75 | 1% |
| 272 | L | H | H | H | L | 0.6 | 6 | 2 | 3 | 0.5 | 120 | 50 | 58% | 55888 | 25295 | 55% | 7.52 | 7.17 | 5% |
| 273 | H | H | H | H | H | 0.7 | 6 | 2 | 3 | 1.5 | 145 | 94 | 35% | 53889 | 37892 | 30% | 9.12 | 8.9 | 2% |
| 274 | C | C | C | C | C | 0.65 | 4.5 | 1.25 | 2.5 | 1 | 119 | 99 | 16% | 47690 | 32093 | 33% | 8.93 | 8.74 | 2% |
| 275 | C | C | C | C | C | 0.65 | 4.5 | 1.25 | 2.5 | 1 | 120 | 83 | 31% | 51889 | 29494 | 43% | 8.85 | 8.52 | 4% |

TABLE III

| | Example Number | | | | | |
|---|---|---|---|---|---|---|
| | 276 | 277 | 278 | 279 | 280 | 281 |
| Before Heat | | | | | | |
| Visc. at 0° C. | 46890 | 43491 | 46290 | 42291 | 35392 | 27994 |
| WSET | 133 | 140 | 121 | 171 | 174 | 157 |
| pH | 8.15 | 8.55 | 8.8 | 9.25 | 9.95 | 10.35 |
| pH at start | 8.10 | 8.60 | 9.00 | 9.50 | 10.00 | 10.00 |
| °Brix | 42.1 | 42.1 | 42.1 | 42.25 | 42 | 42 |
| After Heat | | | | | | |
| Visc. at 0° C. | 25994 | 29994 | 37892 | 35392 | 32093 | 24095 |
| % Loss | 45% | 31% | 18% | 16% | 9% | 14% |
| WSET | 110 | 116 | 115 | 164 | 145 | 135 |
| % Loss | 17% | 17% | 5% | 4% | 17% | 14% |
| pH | 7.15 | 7.65 | 8 | 8.25 | 8.9 | 9.1 |
| % Loss | 12% | 11% | 9% | 11% | 11% | 12% |
| °Brix | 42.1 | 42.1 | 42.1 | 42 | 42 | 42 |

Examples 282–285 explore the effect of alkali metal ion concentration at constant pH. The following compositions were provided by adding the indicated amount of sodium acetate to the fluid of Example 261. Immediately thereafter, the indicated amount of sodium hydroxide was added. All Examples were brought to pH 9.5 by adding NaOH as indicated.

| Example | Grams NaOH Post-Added: |
|---|---|
| 282 Ex. #261 | |
| 283 .25 gram NaAc | 1.29 |
| 284 .50 gram NaAc | 1.34 |
| 285 .75 gram NaAc | 1.40 |

The samples were heat aged at 95° C. for 6 days. Results before and after heat aging are shown in Table IV.

TABLE IV

| | Example | | | |
|---|---|---|---|---|
| | 282 | 283 | 284 | 285 |
| Before Heat | | | | |
| Viscosity @ 0° C. | 37492 | 25994 | 16397 | 12197 |
| WSET Minutes | 150 | 126 | 100 | 80 |
| °Brix | 42.25 | 42.0 | 42.0 | 42.1 |
| pH | 9.5 | 9.4 | 9.5 | 9.4 |
| After Heat | | | | |
| Viscosity @ 0° C. | 35892 | 26394 | 18196 | 13697 |
| WSET Minutes | 119 | 130 | 105 | 74 |
| °Brix | 42.25 | 42.10 | 42.0 | 42.0 |
| pH | 9.65 | 9.50 | 9.45 | 9.45 |
| % Loss Based On | | | | |
| Viscosity @ 0° C. | 4.27 | −1.54 | −10.97 | −12.3 |
| WSET | 20.67 | −3.17 | −5.00 | 7.50 |

These results suggest that small amounts of sodium acetate (on the order of about 0.025%) provide further improvement of the thermal stability (but if too much is used, the impact on the properties before heat aging is too great).

In examples 282–285, it was noted that slightly more NaOH was needed to bring to pH 9.5 those fluids with sodium acetate added. Therefore, in Examples 286–289, Examples 282–285 were repeated, except that the order of addition was reversed so that the sodium hydroxide was added first (to pH 9.5), then the sodium acetate was added.

| Example | |
|---|---|
| 286 | Ex. 261 (No NaAc) |
| 287 | .25 gram NaAc (Post-added) |
| 288 | .50 gram NaAc (Post-added) |
| 289 | .75 gram NaAc (Post-added) |

The samples were heat aged at 95° C. for 6 days. Results before and after heat aging are shown in Table V.

TABLE V

| | Example | | | |
|---|---|---|---|---|
| | 286 | 287 | 288 | 289 |
| Before Heat | | | | |
| Viscosity @ 0° C. | 38292 | 21795 | 10598 | 6499 |
| WSET Minutes | 115 | 104 | 59 | 52 |
| °Brix | 42.0 | 42.1 | 42.1 | 42.0 |
| pH | 9.5 | 9.4 | 9.5 | 9.5 |
| After Heat | | | | |
| Viscosity @ 0° C. | 33092 | 22595 | 12697 | 8898 |
| WSET Minutes | 126 | 122 | 78 | 68 |
| °Brix | 42.0 | 42.0 | 42.25 | 42.0 |
| pH | 9.55 | 9.45 | 9.55 | 9.55 |
| % Loss Based On | | | | |
| Viscosity @ 0° C. | 13.58 | −3.67 | −19.81 | −36.91 |
| WSET | −9.57 | −17.31 | −32.20 | −30.77 |

Further experiments, performed similarly to Examples 282–289, verified that, within experimental error, it makes no significant difference whether the alkali hydroxide or the neutralizing salt is added first, and moreover, that the UAFs of this invention do not decrease significantly in either viscosity or WSET when heated at 95° C. for 6 days.

Examples 290–293 were conducted to evaluate further the effect of a sodium salt on thermal stability with respect to pH. As before, Example 261 fluid was used as the standard. In each case, the pH was adjusted to 8.5 with NaOH, then the indicated amount of sodium acetate was added.

| Example | |
|---|---|
| 290 | Ex. 8 (No NaAc) |
| 291 | .25 gram NaAc (Post-added) |
| 292 | .50 gram NaAc (Post-added) |
| 293 | .75 gram NaAc (Post-added) |

The samples were heat aged at 95° C. for 6 days. Results before and after heat aging are shown in Table VI.

TABLE VI

| | Example Number | | | |
|---|---|---|---|---|
| | 290 | 291 | 292 | 293 |
| Before Heat | | | | |
| Viscosity @ 0° C. | 45890 | 26294 | 11498 | 6299 |
| WSET Minutes | 146 | 120 | 80 | 52 |
| °Brix | 42.0 | 42.0 | 42.0 | 42.1 |
| pH | 8.4 | 8.4 | 8.2 | 8.2 |

TABLE VI-continued

| | Example Number | | | |
|---|---|---|---|---|
| | 290 | 291 | 292 | 293 |
| After Heat | | | | |
| Viscosity @ 0° C. | 32693 | 20796 | 12397 | 8598 |
| WSET Minutes | 138 | 97 | 62 | 71 |
| °Brix | 42.10 | 42.0 | 42.0 | 42.1 |
| pH | 8.70 | 8.55 | 8.55 | 8.45 |
| % Loss Based On | | | | |
| Viscosity @ 0° C. | 28.76 | 20.91 | −7.82 | −36.5 |
| WSET | 5.48 | 19.17 | 22.5 | −36.54 |

From these results it is seen that small amounts of alkali metal ion can significantly improve the thermal stability of a fluid at pH 8.5, in fact, making it as stable as a fluid (with no alkali metal ion) at pH 9.5.

Examples 294–296 were conducted to evaluate the thermal stability of the fluid when dyed, and to evaluate the effects of dilution with water. A 2000-gram batch of fluid made according to Example 261, at pH 9.5, was dyed with 0.2 gram Cartasol Yellow 3GF, plus 0.05 gram Blue 6825–2. Dilutions of neat fluid/water at 75/25 and 50/50, by volume, were made, and a thermal stability test was run in a 95° C. oven for 30 days. For the neat (undiluted) fluid, the thermal stability test was run in a 70° C. oven for 30 days. Results are shown in Table VII.

TABLE VII

| | Sample Number | | |
|---|---|---|---|
| | 294 NEAT | 295 75/25 | 296 50/50 |
| Before Heat | | | |
| Viscosity @ 0° C. | 39092 | 45790 | 8698 |
| WSET Minutes | 144 | 71 | 16 |
| °Brix | 42.1 | 34.25 | 23.5 |
| pH | 9.7 | 9.6 | 9.45 |
| After Heat | | | |
| Viscosity @ 0° C. | 32593 | 29994 | 4999 |
| WSET Minutes | 120 | 41 | 13 |
| °Brix | 42.2 | 33.5 | 24.0 |
| pH | 9.50 | 8.35 | 9.4 |
| % Loss Based On | | | |
| Viscosity @ 0° C. | 7.93 | 34.5 | 42.5 |
| WSET | 16.67 | 42.3 | 18.8 |

With respect to Table VII, the neat fluid of Example 294 would be useful as either a Type IV aircraft fluid or a Type II (anti-icing) fluid. (The SAE test for Type II calls for a viscosity loss of less than 20% after 30 days at 70° C.) The 72/25 dilution would be useful as either a Type II or Type III fluid. (The SAE test calls for WSET values of 30 minutes for Type II and 20 minutes for Type III after 30 days at 95° C.) The 50/50 dilution would still be useful as a Type I (deicer) fluid. (The SAE requirement for WSET is at least 3 minutes for a Type I fluid.)

Examples 297–303 explore the use of a more efficient surfactant than that used in previous examples, "Ingredient S." The following control composition (Example 303) was prepared:

| | Parts | Percent |
|---|---|---|
| Et Glycol | 684.58 | 68.46 |
| Water | 296.4 | 29.64 |
| SAG2001 | 0.51 | 0.05 |
| Thickener (Ex. 8) | 12 | 1.2 |
| Sand. LF | 1 | 0.1 |
| Ingred. S | 4 | 0.4 |
| 45% NaOH | 1.5 | 0.15 |
| Total | 999.99 | 100 |

Additional formulations were made by adjusting the recipe of Example 303, as shown in Examples 297–302. The usual tests were performed, and the results are shown in Table VIII.

TABLE VIII

| Example | Surfactant grams N | Thickener of Ex. 261, grams | WSET | pH | °Brix | Viscosity |
|---|---|---|---|---|---|---|
| 297 | 4.00 | 6.00 | 157 | 9.7 | 42.1 | 85082 |
| 298 | 3.6 | 6.00 | 136 | 9.65 | 42.1 | 72485 |
| 299 | 3.6 | 6.00 | 136 | 9.75 | 42.1 | 51189 |
| 300 | 2.8 | 6.00 | 114 | 9.95 | 42.1 | 38992 |
| 301 | 4.0 | 5.00 | 69 | 10.5 | 42.25 | 28394 |
| 302 | 3.6 | 5.00 | 53 | 10.5 | 42.1 | 20696 |
| 303 | 4.0 g Ingred S. | 6.00 | 113 | 9.7 | 42.1 | 37692 |

In Examples 297–302, Surfactant N is a 5–6 mole ethoxylate of nonyl phenol, available under the trademark Triton® N-57 from Union Carbide Corp., Danbury. Conn.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

We claim:

1. A deicing/anti-icing composition for treatment of aircraft which comprises an aqueous glycol and/or glycerin solution thickened with a polymeric thickener, and/or its salt after neutralization, in an amount sufficient to thicken the fluid to permit its adherence to aircraft surfaces when applied to a stationary aircraft but also permit its windshear-induced removal during takeoff, said polymeric thickener comprising, units of by weight of said thickener, (A) about 1–about 99.9% of one or more alpha, beta-monoethylenically unsaturated carboxylic acids;

(B) 0 to about 98.9% of one or more monoethylenically unsaturated monomers;

(C) about 0.1–about 99% of one or more monoethylenically unsaturated monomers containing at least one pendant hydrophobe moiety; and (D) 0 to about 20% of one or more polyethylenically unsaturated monomers, said composition comprising, by weight of the total composition, (1) at least about 40% of one or more glycols or glycerin or mixture thereof, (2) at least about 0.05% of said thickener, (3) a neutralizing agent comprising sodium hydroxide in an amount sufficient to provide a pH of at least about 7.1, (4) a surfactant which associates with the thickener, in sufficient amount to increase the thickening effect of the thickener, (5) optionally an effective amount of a corrosion inhibitor, (6) optionally one or more dyes, and (7) the remainder being water.

2. The composition of claim 1 wherein the pH is about 8.5 to about 9.5.

3. The composition of claim 2 wherein the surfactant is an octyl- or nonylphenol ethoxylate.

4. The composition of claim 1 further comprising, by weight of the composition, at least about 0.0005%, of a weak auxiliary base.

5. The composition of claim 4 wherein the auxiliary base is an alkali metal salt.

6. The composition of claim 5 wherein the alkali metal salt is an acetate or phosphate.

7. The composition of claim 1 wherein the hydrophobe moiety is a complex hydrophobe moiety.

8. A deicing/anti-icing composition for treatment of aircraft which comprises an aqueous glycol and/or glycerin solution thickened with a polymeric thickener, and/or its salt after neutralization, in an amount sufficient to thicken the fluid to permit its adherence to aircraft surfaces when applied to a stationary aircraft but also permit its windshear-induced removal during takeoff, said polymeric thickener comprising units of by weight of said thickener, (A) about 1–about 99.9% of one or more alpha, beta-monoethylenically unsaturated carboxylic acids;

(B) 0 to about 98.9% of one or more monoethylenically unsaturated monomers;

(C) about 0.1–about 99% of one or more monoethylenically unsaturated monomers containing at least one pendant hydrophobe moiety; and (D) 0 to about 20% of one or more polyethylenically unsaturated monomers, said composition produced by admixing, by weight of the total composition, (1) at least about 40% of one or more glycols or glycerin or mixture thereof, (2) at least about 0.05% of said thickener, (3) a neutralizing agent comprising sodium hydroxide in an amount sufficient to provide a pH of at least about 7.1, (4) a surfactant which associates with the thickener, in sufficient amount to increase the thickening effect of the thickener, (5) optionally an effective amount of a corrosion inhibitor, (6) optionally one or more dyes, and (7) the remainder being water.

9. The composition of claim 8 wherein the pH is about 8.5 to about 9.5.

10. The composition of claim 9 wherein the surfactant is an octyl- or nonylphenol ethoxylate.

11. The composition of claim 8 further comprising, by weight of the composition, at least about 0.0005%, of a weak auxiliary base.

12. The composition of claim 11 wherein the auxiliary base is an alkali metal salt.

13. The composition of claim 11 wherein the alkali metal salt is an acetate or phosphate.

14. The composition of claim 8 wherein the hydrophobe moiety is a complex hydrophobe moiety.

15. The composition of claim 4 wherein the auxiliary base is added to the composition before the hydroxide is added.

16. The composition of claim 11 wherein the auxiliary base is added to the composition before the hydroxide is added.

17. The composition of claim 1 comprising in addition an amine.

18. The composition of claim 7 wherein the amine is monoethanolamine.

19. The composition of claim 8 comprising in addition an amine.

20. The composition of claim 19 wherein the amine is monoethanolamine.

* * * * *